US012677301B2

(12) United States Patent
Jia et al.

(10) Patent No.: US 12,677,301 B2
(45) Date of Patent: Jul. 7, 2026

(54) COMMUNICATION METHOD AND APPARATUS, AND STORAGE MEDIUM

(71) Applicant: HUAWEI TECHNOLOGIES CO., LTD., Shenzhen (CN)

(72) Inventors: Jianxin Jia, Shanghai (CN); Wenfu Wu, Shanghai (CN); Zaifeng Zong, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 770 days.

(21) Appl. No.: 17/982,935

(22) Filed: Nov. 8, 2022

(65) Prior Publication Data

US 2023/0067900 A1    Mar. 2, 2023

Related U.S. Application Data

(63) Continuation of application No. PCT/CN2021/092982, filed on May 11, 2021.

(30) Foreign Application Priority Data

May 11, 2020    (CN) ......................... 202010394473.X
May 22, 2020    (CN) ......................... 202010444431.2

(51) Int. Cl.
    *H04W 72/30*        (2023.01)
    *H04W 4/06*         (2009.01)
(52) U.S. Cl.
    CPC ............. *H04W 72/30* (2023.01); *H04W 4/06* (2013.01)
(58) Field of Classification Search
    CPC ............... H04W 4/06; H04W 36/0007; H04W 36/0044; H04W 36/0055; H04W 72/30
    See application file for complete search history.

(56) References Cited

U.S. PATENT DOCUMENTS 9,807,662 B2 * 10/2017 Wang ................ H04W 36/0007
2012/0236776 A1 * 9/2012 Zhang ................... H04W 60/00
                                                        370/312

(Continued)

FOREIGN PATENT DOCUMENTS

CN          113645572  B      12/2022
WO      WO-2021098123  A1 *    5/2021    ............ H04W 36/02

OTHER PUBLICATIONS

Chinese Office Action issued in corresponding Chinese Patent Application No. 202211511651.8, mailed Dec. 17, 2025, pp. 1-6.

*Primary Examiner* — Thomas R Cairns
*Assistant Examiner* — Kai Chang
(74) *Attorney, Agent, or Firm* — HAUPTMAN HAM, LLP

(57) ABSTRACT

A communication method and apparatus, and a storage medium are provided, to resolve a problem in a conventional technology of discontinuity of a multicast/broadcast service of a UE during handover. The method includes: A target access network device receives first multicast/broadcast service data from a source access network device and second multicast/broadcast service data from a core network device; and if determining that the first multicast/broadcast service data is synchronous with the second multicast/broadcast service data, the target access network device sends the second multicast/broadcast service data to a terminal device, so that the continuity of the multicast/broadcast service of the UE during handover is ensured as much as possible.

24 Claims, 14 Drawing Sheets

(56)     References Cited

U.S. PATENT DOCUMENTS

| | | | | |
|---|---|---|---|---|
| 2014/0204830 A1* | 7/2014 | Wang | ..................... | H04W 48/10 |
| | | | | 370/312 |
| 2018/0331802 A1* | 11/2018 | Bhattad | ............. | H04W 36/0005 |
| 2019/0261240 A1* | 8/2019 | Fang | ................. | H04W 28/0268 |
| 2019/0268815 A1* | 8/2019 | Zhu | ................... | H04W 36/0016 |
| 2021/0352444 A1* | 11/2021 | Griot | ................ | H04W 28/0268 |
| 2022/0256505 A1* | 8/2022 | Qi | ......................... | H04L 12/189 |
| 2023/0018193 A1* | 1/2023 | Zhong | .................... | H04W 4/06 |

* cited by examiner

COMMUNICATION METHOD AND APPARATUS, AND STORAGE MEDIUM

CROSS-REFERENCE TO RELATED APPLICATIONS

This application is a continuation of International Application No. PCT/CN2021/092982, filed on May 11, 2021. The International Application claims priority to Chinese Patent Application No. 202010394473.X, filed on May 11, 2020 and Chinese Patent Application No. 202010444431.2, filed on May 22, 2020. All of the aforementioned patent applications are hereby incorporated by reference in their entireties.

TECHNICAL FIELD

This application relates to the field of communication technologies, and in particular, to a communication method and apparatus, and a storage medium.

BACKGROUND

With development of the mobile internet, multicast/broadcast services are widely applied, for example, applied to fields such as a high-definition video, autonomous driving, an internet of things device, and a public security warning. The following uses a high-definition video service as an example. Currently, users gradually change from watching hot programs on fixed televisions to watching hot programs on mobile phones. Therefore, the video service has strong impact on a mobile network. If transmission of the video service can be optimized in an air interface multicast manner, this helps reduce impact of video data on the mobile network.

In the 3rd generation (the 3rd generation, 3G) mobile communication technology and the 4th generation (the 4th generation, 4G) mobile communication technology, a dedicated network element and interface that support a multicast service need to be added based on an existing 3G or 4G communication network architecture, and a dedicated multicast channel is further required for support. In this way, not only overheads of operators are increased, but also complexity of terminals is increased. To overcome the foregoing difficulties, supporting a multicast broadcast service (multicast broadcast service, MBS) based on a 5th generation (the 5th generation, 5G) communication network architecture becomes an important research point.

In 5G, a key issue (key issue) of MBS research is service continuity (service continuity). When a terminal device is handed over from a source access network device to a target access network device, how to ensure continuity of a multicast/broadcast service of the terminal device is a current urgent problem to be resolved.

SUMMARY

This application provides a communication method and apparatus, and a storage medium, to ensure that continuity of a multicast/broadcast service of a terminal device is not affected in a process in which the terminal device is handed over from a source access network device to a target access network device.

According to a first aspect, this application provides a communication method. The method includes: A source access network device receives first radio bearer configuration information and second radio bearer configuration information from a target access network device, where the first radio bearer configuration information is used by a terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The source access network device sends the first radio bearer configuration information and the second radio bearer configuration information to the terminal device.

It should be noted that the first multicast/broadcast service data and the second multicast/broadcast service data are data of a same-source service.

Based on this solution, the terminal device may receive the first multicast/broadcast service data by using the first radio bearer configuration information, and receive the second multicast/broadcast service data by using the second radio bearer configuration information. Therefore, it can be ensured that continuity of a multicast/broadcast service of the terminal device is not affected in a process in which the terminal device is handed over from the source access network device to the target access network device. In other words, a packet loss during handover of the terminal device can be reduced, and a delay is reduced.

In a possible implementation, the source access network device sends the first multicast/broadcast service data to the target access network device, where the first multicast/broadcast service data is associated with a protocol data unit (protocol data unit, PDU) session of the terminal device.

In a possible implementation, the source access network device sends the first multicast/broadcast service data to the target access network device through a first forwarding tunnel or a second forwarding tunnel, where the first forwarding tunnel is a forwarding tunnel corresponding to a first multicast/broadcast session of the terminal device, the second forwarding tunnel is a forwarding tunnel corresponding to a PDU session tunnel of the terminal device, and the first multicast/broadcast session corresponds to the first multicast/broadcast service.

In a possible implementation, after determining that a first timer expires, the source access network device stops sending the first multicast/broadcast service data to the target access network device.

In a possible implementation, the source access network device receives an end data packet from a session management network element or a user plane network element, where the end data packet indicates the target access network device to stop receiving the first multicast/broadcast service data through the first forwarding tunnel or the second forwarding tunnel, and the end data packet is constructed by the session management network element after a third timer expires, or is constructed by the user plane network element after a fourth timer expires. The source access network device sends the end data packet to the target access network device.

In a possible implementation, the source access network device receives an end data packet from a session management network element or a user plane network element, where the end data packet indicates the target access network device to stop receiving the first multicast/broadcast service data through the first forwarding tunnel or the second forwarding tunnel. The source access network device sends the end data packet to the target access network device after determining that a fifth timer expires.

According to a second aspect, this application provides a communication method. The method includes: A target access network device determines first radio bearer configuration information and second radio bearer configuration information of a terminal device, where the first radio bearer configuration information is used by the terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The target access network device sends the first radio bearer configuration information and the second radio bearer configuration information to the source access network device.

In a possible implementation, the target access network device receives the first multicast/broadcast service data from the source access network device, where the first multicast/broadcast service data is associated with a PDU session of the terminal device.

In a possible implementation, the target access network device receives the first multicast/broadcast service data from the source access network device through a first forwarding tunnel or a second forwarding tunnel, where the first forwarding tunnel is a forwarding tunnel corresponding to a first multicast/broadcast session of the terminal device, the second forwarding tunnel is a forwarding tunnel corresponding to a PDU session tunnel of the terminal device, and the first multicast/broadcast session corresponds to the first multicast/broadcast service.

In a possible implementation, the target access network device receives a first request message from the source access network device, where the first request message is used to request the target access network device to establish a forwarding tunnel corresponding to the first multicast/broadcast service with the source access network device.

In a possible implementation, the target access network device sends the first multicast/broadcast service data to the terminal device in an air interface unicast mode, and sends the second multicast/broadcast service data to the terminal device in an air interface multicast/broadcast mode or an air interface unicast mode.

In a possible implementation, after receiving an end data packet from the source access network device, the target access network device stops receiving the first multicast/broadcast service data through the first forwarding tunnel or the second forwarding tunnel, where the end data packet is constructed and sent by a session management network element after a third timer expires; or is constructed and sent by a user plane network element after a fourth timer expires; or is sent by the source access network device after the source access network device determines that a fifth timer expires.

According to a third aspect, this application provides a communication method. The method includes: A terminal device receives first radio bearer configuration information and second radio bearer configuration information from a source access network device, where the first radio bearer configuration information is used by a terminal device to receive first multicast/broadcast service data that is transmitted in an air interface unicast mode and that is from a target access network device, and the second radio bearer configuration information is used by the terminal device to receive second multicast/broadcast service data that is transmitted in an air interface multicast/broadcast mode or an air interface unicast mode and that is from the target access network device. The terminal device receives the first multicast/broadcast service data from the target access network device in an air interface unicast mode, and receives the second multicast/broadcast service data from the target access network device in an air interface multicast/broadcast mode or an air interface unicast mode, where the first multicast/broadcast service data is associated with a protocol data unit PDU session of the terminal device.

In a possible implementation, the terminal device deduplicates duplicate data between the first multicast/broadcast service data and the second multicast/broadcast service data.

According to a fourth aspect, this application provides a communication method. The method includes: A session management network element constructs an end data packet when determining that a third timer expires, where the end data packet indicates a target access network device to stop receiving first multicast/broadcast service data through a forwarding tunnel corresponding to a PDU session tunnel of a terminal device. The session management network element sends the end data packet to the target access network device by using a source access network device.

According to a fifth aspect, this application provides a communication method. The method includes: A user plane network element sends a fourth response message to a session management network element. The user plane network element receives an end data packet constructed by the session management network element, where the end data packet is constructed by the session management network element after receiving the fourth response message sent by the user plane network element, and the fourth response message is an N4 session response message. The user plane network element sends the end data packet to a target access network device when determining that a second timer expires.

According to a sixth aspect, this application provides a communication method. The method includes: A user plane network element constructs an end data packet when determining that a fourth timer expires, where the end data packet indicates a target access network device to stop receiving first multicast/broadcast service data through a forwarding tunnel corresponding to a PDU session tunnel of a terminal device. The user plane network element sends the end data packet to the target access network device.

According to a seventh aspect, this application provides a communication method. The method includes: A source access network device receives first radio bearer configuration information from a target access network device, where the first radio bearer configuration information is used by a terminal device to receive first multicast/broadcast service data that is transmitted in an air interface unicast mode and that is from the target access network device. The source access network device sends the first radio bearer configuration information to the terminal device. After receiving first information from the target access network device, the source access network device stops sending the first multicast/broadcast service data to the target access network device, where the first information indicates the source access network device to stop sending the first multicast/broadcast service data to the target access network device, the first multicast/broadcast service data is associated with a PDU session of the terminal device, and the first multicast/broadcast service data is forwarded by the source access network device to the target access network device.

In a possible implementation, the source access network device sends the first multicast/broadcast service data to the target access network device.

In a possible implementation, the source access network device sends the first multicast/broadcast service data to the target access network device through a first forwarding tunnel or a second forwarding tunnel, where the first forwarding tunnel is a forwarding tunnel corresponding to a first multicast/broadcast session of the terminal device, the second forwarding tunnel is a forwarding tunnel corresponding to a PDU session tunnel of the terminal device, and the first multicast/broadcast session corresponds to the first multicast/broadcast service.

According to an eighth aspect, this application provides a communication method. The method includes: A target access network device determines first radio bearer configuration information and second radio bearer configuration information of a terminal device, where the first radio bearer configuration information is used by the terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The target access network device sends the first radio bearer configuration information to a source access network device. The target access network device receives the first multicast/broadcast service data from the source access network device, where the first multicast/broadcast service data is associated with a PDU session of the terminal device. If determining that the received first multicast/broadcast service data is synchronous with the second multicast/broadcast service data, the target access network device sends first information to the source access network device, where the first information indicates the source access network device to stop sending the first multicast/broadcast service data to the target access network device. The target access network device sends the second radio bearer configuration information to the terminal device, where the second radio bearer configuration information is used by the terminal device to receive the second multicast/broadcast service data that is transmitted in an air interface multicast/broadcast mode or an air interface unicast mode and that is from the target access network device.

In a possible implementation, the target access network device sends the first multicast/broadcast service data to the terminal device in an air interface unicast mode, and sends the second multicast/broadcast service data to the terminal device in an air interface multicast/broadcast mode or an air interface unicast mode.

In a possible implementation, if determining that a sequence number of the first multicast/broadcast service data is equal to a sequence number of the second multicast/broadcast service data, the target access network device determines that the first multicast/broadcast service data is synchronous with the second multicast/broadcast service data.

In a possible implementation, if determining that the received first multicast/broadcast service data is earlier than the second multicast/broadcast service data, the target access network device sends the first information to the source access network device.

In a possible implementation, if determining that a sequence number of the first multicast/broadcast service data is greater than a sequence number of the second multicast/broadcast service data, the target access network device determines that the first multicast/broadcast service data is earlier than the second multicast/broadcast service data.

In a possible implementation, if determining that a sequence number of the first multicast/broadcast service data is greater than a sequence number of the second multicast/broadcast service data, the target access network device decreases a sending rate of the first multicast/broadcast service data in an air interface unicast mode, and/or increases a sending rate of the second multicast/broadcast service data in an air interface multicast/broadcast mode or an air interface unicast mode.

In a possible implementation, if determining that the received first multicast/broadcast service data is later than the second multicast/broadcast service data, the target access network device increases a sending rate of the first multicast/broadcast service data in an air interface unicast mode, and/or decreases a sending rate of the second multicast/broadcast service data in an air interface multicast/broadcast mode or an air interface unicast mode.

In a possible implementation, if determining that a sequence number of the first multicast/broadcast service data is less than a sequence number of the second multicast/broadcast service data, the target access network device determines that the received first multicast/broadcast service data is later than the second multicast/broadcast service data.

According to a ninth aspect, this application provides a communication method. The method includes: A source access network device sends first multicast/broadcast service data to a target access network device through a forwarding tunnel corresponding to a PDU session tunnel of a terminal device. The source access network device receives an end data packet from a session management network element or a user plane network element, where the end data packet indicates the target access network device to stop receiving the first multicast/broadcast service data through the forwarding tunnel corresponding to the PDU session tunnel of the terminal device, and the end data packet is constructed by the session management network element after a third timer expires, or is constructed by the user plane network element after a fourth timer expires. The source access network device sends the end data packet to the target access network device.

In a possible implementation, the source access network device receives first radio bearer configuration information from the target access network device, where the first radio bearer configuration information is used by the terminal device to receive the first multicast/broadcast service data that is transmitted in an air interface unicast mode and that is from the target access network device. The source access network device sends the first radio bearer configuration information to the terminal device.

According to a tenth aspect, this application provides a communication method. The method includes: A target access network device receives first multicast/broadcast service data from a source access network device, where the first multicast/broadcast service data is sent through a forwarding tunnel corresponding to a PDU session tunnel of a terminal device. The target access network device receives an end data packet from the source access network device, and stops receiving the first multicast/broadcast service data through the forwarding tunnel corresponding to the PDU session tunnel of the terminal device, where the end data packet is constructed by a session management network element after a third timer expires, or is constructed by a user plane network element after a fourth timer expires.

In a possible implementation, the target access network device sends the first multicast/broadcast service data to the terminal device in an air interface unicast mode.

According to an eleventh aspect, this application provides a communication method. The method includes: A source access network device sends first multicast/broadcast service data to a target access network device through a forwarding tunnel corresponding to a PDU session tunnel of a terminal device. The source access network device receives an end data packet from a session management network element or a user plane network element, where the end data packet indicates the target access network device to stop receiving the first multicast/broadcast service data through the forwarding tunnel corresponding to the PDU session tunnel of the terminal device. The source access network device sends the end data packet to the target access network device after determining that a fifth timer expires.

In a possible implementation, the source access network device receives first radio bearer configuration information from the target access network device, where the first radio bearer configuration information is used by the terminal device to receive the first multicast/broadcast service data that is transmitted in an air interface unicast mode and that is from the target access network device. The source access network device sends the first radio bearer configuration information to the terminal device.

According to a twelfth aspect, this application provides a communication method. The method includes: A target access network device receives first multicast/broadcast service data from a source access network device, where the first multicast/broadcast service data is sent through a forwarding tunnel corresponding to a PDU session tunnel of a terminal device. The target access network device receives an end data packet from the source access network device, and stops receiving the first multicast/broadcast service data through the forwarding tunnel corresponding to the PDU session tunnel of the terminal device, where the end data packet is sent by the source access network device after the source access network device determines that a fifth timer expires.

In a possible implementation, the target access network device sends the first multicast/broadcast service data to the terminal device in an air interface unicast mode.

According to a thirteenth aspect, this application provides a communication method. The method includes: A session management network element sets an eighth timer to store (or cache) second multicast/broadcast service data in a user plane network element, and after the session management network element determines that the eighth timer expires, the UPF sends the second multicast/broadcast service data stored in the UPF to the target access network device.

In a possible implementation, the session management network element sends an N4 session update request message to the user plane network element, where the N4 session update request message may include identifier information that is of a PDU session tunnel and that is allocated by the target access network device and/or tunnel identifier information allocated by the session management network element to the user plane network element. In other words, the N4 session update request is used to request to hand over a downlink path of a protocol data unit PDU session to the target access network device.

In a possible implementation, the session management network element starts the eighth timer in a case that a core network device sends the second multicast/broadcast service data to the target access network device.

In a possible implementation, the session management network element sends first indication information to the user plane network element, where the first indication information indicates the user plane network element to store the second multicast/broadcast service data.

In a possible implementation, after determining that the eighth timer expires, the session management network element sends second indication information to the user plane network element, where the second indication information indicates the user plane network element to send the stored second multicast/broadcast service data to the target access network device.

Optionally, the first indication information may be carried in the N4 session update request message; or the second indication information may be carried in the N4 session update request message.

According to a fourteenth aspect, this application provides a communication method. The method includes: A session management network element sends first indication information to a user plane network element, and sends second indication information to the user plane network element after determining that an eighth timer expires, where the first indication information indicates the user plane network element to store second multicast/broadcast service data, and the second indication information indicates the user plane network element to send the stored second multicast/broadcast service data to a target access network device.

In a possible implementation, the first indication information may be carried in an N4 session update request message; or the second indication information may be carried in an N4 session update request message.

According to a fifteenth aspect, this application provides a communication method. The method includes: A target access network device receives first multicast/broadcast service data from a source access network device and second multicast/broadcast service data from a core network device. If determining that the first multicast/broadcast service data is synchronous with the second multicast/broadcast service data, the target access network device sends the second multicast/broadcast service data to a terminal device.

Based on this solution, when determining that the first multicast/broadcast service data is synchronous with the second multicast/broadcast service data, the target access network device sends the second multicast/broadcast service data to the terminal device. In this way, in a process in which the terminal device is handed over from the source access network device to the target access network device, it can be ensured that continuity of a multicast/broadcast service of the terminal device is not affected. In other words, a packet loss during handover of the terminal device can be reduced, and a delay is reduced.

In a possible implementation, if determining that a sequence number of the first multicast/broadcast service data plus one is greater than or equal to a sequence number of the second multicast/broadcast service data, the target access network device determines that the first multicast/broadcast service data is synchronous with the second multicast/broadcast service data.

In a possible implementation, the target access network device discards the first multicast/broadcast service data whose sequence number of the first multicast/broadcast service data plus one is greater than the sequence number of the second multicast/broadcast service data. Further, optionally, the target access network device increases a sending rate of the second multicast/broadcast service data, and/or decreases a sending rate of the first multicast/broadcast service data.

In a possible implementation, if determining that the first multicast/broadcast service data is not synchronous with the second multicast/broadcast service data, the target access network device adjusts the first multicast/broadcast service data to be synchronous with the second multicast/broadcast service data.

In a possible implementation, if determining that a sequence number of the first multicast/broadcast service data plus one is less than a sequence number of the second multicast/broadcast service data, the target access network device caches the second multicast/broadcast service data. If determining that the sequence number of the received first multicast/broadcast service data plus one is equal to a sequence number of the $1^{st}$ cached second multicast/broadcast service data, the target access network device determines that the first multicast/broadcast service data is synchronous with the second multicast/broadcast service data.

In a possible implementation, if determining that the sequence number of the first multicast/broadcast service data plus one is less than the sequence number of the second multicast/broadcast service data, the target access network device decreases a sending rate of the second multicast/broadcast service data, and/or increases a sending rate of the first multicast/broadcast service data. In this way, this helps quickly synchronize the first multicast/broadcast service data with the second multicast/broadcast service data.

In a possible implementation, the target access network device determines first radio bearer configuration information and second radio bearer configuration information of the terminal device, where the first radio bearer configuration information is used by the terminal device to receive the first multicast/broadcast service data sent by the target access network device, and the second radio bearer configuration information is used by the terminal device to receive the second multicast/broadcast service data sent by the target access network device. The target access network device sends the second radio bearer configuration information to the terminal device.

In a possible implementation, if determining that the first multicast/broadcast service data is synchronous with the second multicast/broadcast service data, the target access network device sends first information to the source access network device, where the first information indicates the source access network device to stop sending the first multicast/broadcast service data to the target access network device.

According to a sixteenth aspect, this application provides a communication method. The method includes: A target access network device receives first multicast/broadcast service data from a source access network device and second multicast/broadcast service data from a core network device. The target access network device determines, based on a sequence number of the first multicast/broadcast service data and a sequence number of the second multicast/broadcast service data, a time for sending the second multicast/broadcast service data to a terminal device.

In a possible implementation, the target access network device may determine a time at which the first multicast/broadcast service data is synchronous with the second multicast/broadcast service data as the time for sending the second multicast/broadcast service data to the terminal device.

According to a seventeenth aspect, this application provides a communication apparatus. The communication apparatus is configured to implement: a function of the source access network device in the first aspect, the seventh aspect, the ninth aspect, or the eleventh aspect, a function of the target access network device in the second aspect, the eighth aspect, the tenth aspect, the twelfth aspect, the fifteenth aspect, or the sixteenth aspect, a function of the terminal device in the third aspect, a function of the session management network element in the fourth aspect, the thirteenth aspect, or the fourteenth aspect, or a function of the user plane network element in the fifth aspect or the sixth aspect. The functions may be implemented by hardware, or may be implemented by hardware executing corresponding software. The hardware or software includes one or more units or modules corresponding to the foregoing functions.

In a possible implementation, the communication apparatus may be a terminal device, or may be a module, for example, a chip, a chip system, or a circuit, that can be used in the terminal device. For beneficial effects, refer to the foregoing related descriptions. Details are not described herein again. The communication apparatus may include: a transceiver and a processor. Further, the processor may be configured to support the communication apparatus in performing the corresponding function of the foregoing terminal device. The transceiver is configured to support the communication apparatus in communicating with a network device, another terminal device, and the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

For example, the transceiver and the processor may perform the corresponding function of the terminal device in the foregoing method example. For details, refer to detailed descriptions in the method example. Details are not described herein again.

In another possible implementation, the communication apparatus may be an access network device, or a component, for example, a chip, a chip system, or a circuit, that can be used in an access network device. The communication apparatus may include: a transceiver and a processor. The processor may be configured to support the communication apparatus in performing the corresponding function of the foregoing access network device. The transceiver is configured to support the communication apparatus in communicating with another access network device, a terminal device, and the like. The transceiver may be an independent receiver, an independent transmitter, a transceiver integrating receiving and sending functions, or an interface circuit. Optionally, the communication apparatus may further include a memory. The memory may be coupled to the processor, and stores program instructions and data that are necessary for the communication apparatus.

For example, the transceiver and the processor may perform the corresponding function of the source access network device in the foregoing method example. For details, refer to detailed descriptions in the method example. Details are not described herein again. Alternatively, the transceiver and the processor may perform the corresponding function of the target access network device in the foregoing method example. For details, refer to detailed descriptions in the method example. Details are not described herein again.

According to an eighteenth aspect, this application provides a communication apparatus. The communication apparatus is configured to implement: the method in the first aspect or the possible implementations in the first aspect, the method in the second aspect or the possible implementations in the second aspect, the method in the third aspect or the possible implementations in the third aspect, the method in the fourth aspect or the possible implementations in the fourth aspect, the method in the fifth aspect or the possible implementations in the fifth aspect, the method in the sixth aspect or the possible implementations in the sixth aspect, the method in the seventh aspect or the possible implementations in the seventh aspect, the method in the eighth aspect or the possible implementations in the eighth aspect, the method in the ninth aspect or the possible implementations in the ninth aspect, the method in the tenth aspect or the possible implementations in the tenth aspect, the method in the eleventh aspect or the possible implementations in the eleventh aspect, the method in the twelfth aspect or the possible implementations in the twelfth aspect, the method in the fifteenth aspect or the possible implementations in the fifteenth aspect, or the method in the sixteenth aspect or the possible implementations in the sixteenth aspect, and includes corresponding functional modules, separately configured to implement steps in the foregoing methods. Functions may be implemented by hardware, or may be implemented by hardware executing corresponding software. The hardware or software includes one or more modules corresponding to the foregoing functions.

In a possible implementation, the communication apparatus may be a terminal device, and the communication apparatus may include: a processing module and a transceiver module. These modules may perform a corresponding function of the terminal device in the foregoing method example. For details, refer to detailed descriptions in the method example. Details are not described herein again.

In another possible implementation, the communication apparatus may alternatively be a network device, and the communication apparatus may include a transceiver module and a processing module. These modules may perform a corresponding function of the network device in the foregoing method example. For details, refer to detailed descriptions in the method example. Details are not described herein again.

According to a nineteenth aspect, this application provides a communication system. The communication system includes: a terminal device, a source access network device, and a target access network device, and may further include: a session management network element and/or a user plane network element. The source access network device may be configured to perform: the method in the first aspect or the possible implementations in the first aspect, the method in the seventh aspect or the possible implementations in the seventh aspect, the method in the ninth aspect or the possible implementations in the ninth aspect, or the method in the eleventh aspect or the possible implementations in the eleventh aspect. The target access network device may be configured to perform: the method in the second aspect or the possible implementations in the second aspect, the method in the eighth aspect or the possible implementations in the eighth aspect, the method in the tenth aspect or the possible implementations in the tenth aspect, the method in the twelfth aspect or the possible implementations in the twelfth aspect, the method in the fourteenth aspect or the possible implementations in the fourteenth aspect, the method in the fifteenth aspect or the possible implementations in the fifteenth aspect, or the method in the sixteenth aspect or the possible implementations in the sixteenth aspect. The terminal device may be configured to perform the method in the third aspect or the possible implementations in the third aspect. The session management network element may be configured to perform: the method in the fourth aspect or the possible implementations in the fourth aspect, the method in the thirteenth aspect or the possible implementations in the thirteenth aspect, or the method in the fourteenth aspect or the possible implementations in the fourteenth aspect. The user plane network element is configured to perform: the method in the fifth aspect or the possible implementations in the fifth aspect, or the method in the sixth aspect or the possible implementations in the sixth aspect.

According to a twentieth aspect, this application provides a communication system. The communication system includes: a session management network element and a user plane network element. Further, optionally, a target access network device may be further included. The session management network element may be configured to perform: the method in the fourth aspect or the possible implementations in the fourth aspect, the method in the thirteenth aspect or the possible implementations in the thirteenth aspect, or the method in the fourteenth aspect or the possible implementations in the fourteenth aspect. The user plane network element is configured to perform the method in the fifth aspect or the possible implementations in the fifth aspect, or the method in the sixth aspect or the possible implementations in the sixth aspect.

According to a twenty-first aspect, this application provides a computer-readable storage medium. The computer-readable storage medium stores a computer program or instructions, and when the computer program or the instructions are executed by a communication apparatus, the communication apparatus is enabled to perform: the method in the first aspect or the possible implementations of the first aspect, or the communication apparatus is enabled to perform: the method in the second aspect or the possible implementations of the second aspect, the method in the third aspect or the possible implementations in the third aspect, the method in the fourth aspect or the possible implementations in the fourth aspect, the method in the fifth aspect or the possible implementations in the fifth aspect, the method in the sixth aspect or the possible implementations in the sixth aspect, the method in the seventh aspect or the possible implementations in the seventh aspect, the method in the eighth aspect or the possible implementations in the eighth aspect, the method in the ninth aspect or the possible implementations in the ninth aspect, the method in the tenth aspect or the possible implementations in the tenth aspect, the method in the eleventh aspect or the possible implementations in the eleventh aspect, the method in the twelfth aspect or the possible implementations in the twelfth aspect, the method in the thirteenth aspect or the possible implementations in the thirteenth aspect, the method in the fourteenth aspect or the possible implementations in the fourteenth aspect, the method in the fifteenth aspect or the possible implementations in the fifteenth aspect, or the method in the sixteenth aspect or the possible implementations in the sixteenth aspect.

According to a twenty-second aspect, this application provides a computer program product. The computer program product includes a computer program or instructions, and when the computer program or the instructions are executed by a communication apparatus, the method in the first aspect or the possible implementations of the first aspect, the method in the second aspect or the possible implementations of the second aspect, the method in the third aspect or the possible implementations in the third aspect, the method in the fourth aspect or the possible implementations in the fourth aspect, the method in the fifth aspect or the possible implementations in the fifth aspect, the method in the sixth aspect or the possible implementations in the sixth aspect, the method in the seventh aspect or the possible implementations in the seventh aspect, the method in the eighth aspect or the possible implementations in the eighth aspect, the method in the ninth aspect or the possible implementations in the ninth aspect, the method in the tenth aspect or the possible implementations in the tenth aspect, the method in the eleventh aspect or the possible implementations in the eleventh aspect, the method in the twelfth aspect or the possible implementations in the twelfth aspect, the method in the thirteenth aspect or the possible implementations in the thirteenth aspect, the method in the fourteenth aspect or the possible implementations in the fourteenth aspect, the method in the fifteenth aspect or the possible implementations in the fifteenth aspect, or the method in the sixteenth aspect or the possible implementations in the sixteenth aspect is implemented.

DESCRIPTION OF EMBODIMENTS

The following describes in detail embodiments of this application with reference to the accompanying drawings.

Figure 1:
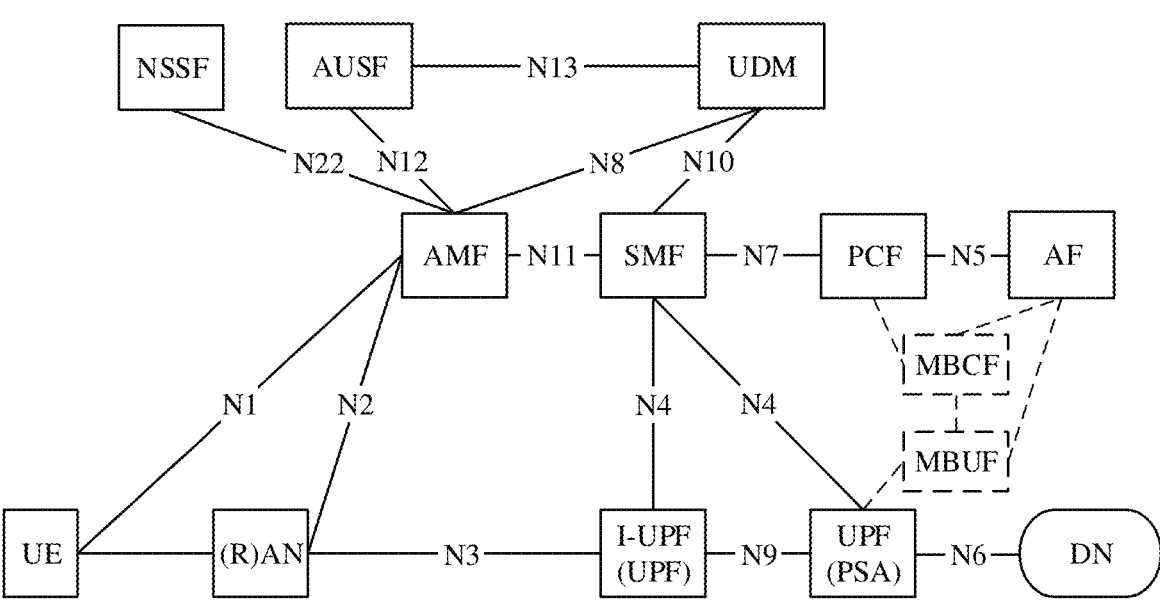
FIG. 1 is a schematic diagram of an architecture of a communication system according to this application.

FIG. 1 is a schematic diagram of an architecture of a communication system to which this application is applicable. As shown in FIG. 1, the communication system may include: a data management network element, an authentication server network element, a mobility management network element, a session management network element, a policy control network element, and a user plane network element. Further, the architecture of the communication system further includes: an access network device, a terminal device, and a data network (data network, DN) network element. Further, the communication system may further include a multicast/broadcast control plane function (multicast/broadcast control function, MBCF) network element and a multicast/broadcast user plane function (multicast broadcast user plane function, MBUF) network element. The policy control network element, the data management network element, the authentication server network element, the mobility management network element, and the session management network element may be connected through a bus. The bus herein means that connection and communication between the network elements in the communication system can be logically implemented. The connection and communication between the network elements in the communication system may be implemented through an interface or a network. FIG. 1 is described by using an example in which the data management network element is a UDM network element, the authentication server network element is an AUSF network element, the mobility management network element is an AMF network element, the session management function network element is an SMF network element, the policy control network element is a PCF network element, the user plane function network element is a UPF network element, the data network network element is a DN, and the terminal device is a UE. The terminal device may communicate with the AMF network element through a next generation network (next generation, NG) 1 interface (N1 for short), the access network device communicates with the AMF network element through an N2 interface (N2 for short), the access network device communicates with the UPF network element through an N3 interface (N3 for short), the AMF network element communicates with the SMF network element through an N11 interface (N11 for short), the AMF network element communicates with the UDM network element through an N8 interface (N8 for short), the AMF network element communicates with the AUSF network element through an N12 interface (N12 for short), the AMF network element communicates with the PCF network element through an N15 interface (N15 for short), the SMF network element communicates with the PCF network element through an N7 interface (N7 for short), the SMF network element communicates with the UPF network element through an N4 interface (N4 for short), and the UPF network element accesses a data network (data network, DN) through an N6 interface (N6 for short).

The data management network element is mainly configured to manage and store user data such as subscription information and authentication/authorization information. In the 5th generation (5th generation, 5G), the data management network element may be a unified data management (unified data management, UDM) network element or a unified data repository function (unified data repository, UDR) network element. In future communication such as the 6th generation (6th generation, 6G), the data management network element may still be a UDM network element or a UDR network element, or have another name. This is not limited in this application.

The authentication server network element is mainly configured to use an extensible authentication protocol (extensible authentication protocol, EAP) to verify a service function and store a key, to implement authentication and authorization on a user. In 5G, the authentication server network element may be an authentication server function (authentication server function, AUSF) network element. In future communication such as 6G, the user plane network element may still be the AUSF network element, or have another name. This is not limited in this application.

The session management network element is mainly used for session management in a mobile network and selection and control of the user plane network element. The session management is, for example, session creation, modification, and release. Specific functions include, for example, allocating an internet protocol (internet protocol, IP) address to the user, and selecting the user plane network element that provides a packet forwarding function. In 5G, the session management network element may be a session management function (session management function, SMF) network element. In future communication such as 6G, the session management network element may still be an SMF network element, or have another name. This is not limited in this application.

The mobility management network element is mainly used for registration, mobility management, and a tracking area update procedure for the terminal device in the mobile network. The mobility management network element terminates a non-access stratum (non-access stratum, NAS) message, completes registration management, connection management, reachability management, tracking area list (track area list, TA list) allocation, mobility management, and the like, and transparently routes a session management (session management, SM) message to the session management network element. In 5G communication, the mobility management network element may be an access and mobility management function (access and mobility management function, AMF) network element. In future communication such as 6G, the mobility management network element may still be an AMF network element, or have another name. This is not limited in this application.

The policy control network element is mainly used for user subscription data management, charging policy control, quality of service (quality of service, QoS) control, and the like. In 5G, the policy control network element may be a policy control function (policy control function, PCF) network element. In future communication such as 6G, the policy control network element may still be a PCF network element, or have another name. This is not limited in this application.

The user plane network element is mainly used for user plane service processing, for example, data packet routing and transmission, packet detection, service usage reporting, quality of service (quality of service, QoS) processing, lawful interception, uplink packet detection, and downlink data packet storage. In 5G, the user plane network element may be a user plane function (user plane function, UPF) network element. In future communication such as 6G, the user plane network element may still be a UPF network element, or have another name. This is not limited in this application.

The data network network element is mainly configured to provide a service for the user, for example, a service of an operator, an Internet access service, or a third-party service. In 5G, the data network network element may be a data network (data network, DN) network element. In future communication such as 6G, the data network network element may still be a DN network element, or have another name. This is not limited in this application.

The access network device is an access device through which the terminal device accesses the communication system in a wireless manner, and may provide a wireless communication function for the terminal device. The access network device may be a base station (base station), an evolved NodeB (evolved NodeB, eNodeB), a transmission reception point (transmission reception point, TRP), a next generation NodeB (next generation NodeB, gNB) in a 5G communication system, a base station in a future communication system, an access node in a wireless fidelity (wireless-fidelity, Wi-Fi) system, or the like; or may be a module or a unit that completes a part of a function of a base station, for example, may be a central unit (central unit, CU) or a distributed unit (distributed unit, DU). A specific technology and a specific device form that are used for the access network device are not limited in embodiments of this application.

The terminal device may also be referred to as a terminal, a user equipment (user equipment, UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used for the terminal device are not limited in this application.

The MBCF implements a control plane function of a multicast/broadcast service, and is responsible for management of the multicast/broadcast service. The MBCF may be connected to a server of the multicast/broadcast service, to receive information related to the multicast/broadcast service. For details, refer to the following description of the multicast/broadcast service. Details are not described herein again. In addition, the MBCF may be further connected to the PCF, to create a resource for the multicast/broadcast service, for example, a QoS requirement (refer to the following related description). It should be noted that the MBCF may be integrated into the PCF or the SMF as a functional module, or may be used as an independent network element (as shown in FIG. 1). This is not limited in this application.

The MBUF may be configured to transmit service data of the multicast/broadcast service. It should be noted that the MBUF may be integrated into the UPF as a functional module, or may be used as an independent network element (as shown in FIG. 1). This is not limited in this application.

It should be noted that forms and quantities of the network elements shown in FIG. 1 are merely used as examples, and do not constitute a limitation on this application. The network architecture in FIG. 1 may further include another network element, for example, a network element or a device such as a network slice selection function (network slice selection function, NSSF), a unified data repository (unified data repository, UDR), or a network repository function (network repository function, NRF). This is not specifically limited. In addition, names of the network elements and the interfaces between the network elements in FIG. 1 are merely examples. During specific implementation, the names of the network elements and the interfaces between the network elements may be others. This is not specifically limited in embodiments of this application.

For ease of description, subsequently, an example in which the session management function network element is the SMF network element, the user plane function network element is the UPF network element, the data management network element is the UDM network element, the authentication server network element is the AUSF network element, the data network network element is the DN network element, and the terminal device is the UE is used for description is used in this application. In other words, the SMF network element described subsequently in this application may be replaced with the session management function network element, the UPF network element may be replaced with the user plane function network element, the UDM may be replaced with the data management network element, and the UE may be replaced with the terminal device.

The following explains and describes some terms in this application, to facilitate understanding of a person skilled in the art. It should be noted that these explanations are not intended to limit the protection scope claimed in this application.

1. Unicast

Unicast may be understood as "point-to-point" (point to point, PTP) communication. At a service layer, a unicast service means that data of the service is sent to a single terminal device. At a core network service layer, unicast means sending the service data to a terminal device by using a PDU session. Between network elements (or devices), unicast means that there is a unicast tunnel between a source network element and a target network element (in other words, an IP address of the target network element is a unicast IP address). For an air interface, an air interface unicast mode (or referred to as a point-to-point mode) means that an access network device sends the service data to the single terminal device. It may be understood as that the access network device sends the service data to the single terminal device by using a radio bearer in the air interface unicast mode.

2. Multicast/Broadcast

Multicast/Broadcast refers to multicast (multicast) or broadcast (broadcast), and may be understood as "point-to-multipoint" (point to multi-point, PTM) communication. At a service layer, a multicast/broadcast service means that data of the service is sent to a plurality of terminal devices. At a core network service layer, the multicast/broadcast service means that the service data of the multicast/broadcast service is sent to the terminal device by using a multicast/broadcast session. Between network elements, multicast means that there is a multicast tunnel between a source network element and a target network element (in other words, an IP address of the target network element is a multicast IP address). For an air interface, an air interface multicast/broadcast mode means that one piece of service data sent by an access network device may be received by the plurality of terminal devices at the same time and/or at a same frequency. In other words, embodiments in this application may be applied to both multicast service transmission and broadcast service transmission.

3. Multicast/Broadcast Session Tunnel

A multicast/broadcast session tunnel related to a multicast service may be established between an access network device and a core network device. Multicast/broadcast service data is transmitted in the multicast/broadcast session tunnel. The multicast/broadcast service data received by the access network device through the multicast/broadcast session tunnel may be sent to a plurality of terminal devices that join the multicast/broadcast service. The multicast/broadcast service data in the multicast/broadcast session tunnel may be transmitted in a form of a multicast/broadcast quality of service (quality of service, QoS) flow. Specifically, the multicast/broadcast service may be transmitted in the multicast/broadcast session tunnel in a manner of one or more multicast/broadcast QoS flows.

It should be understood that the multicast/broadcast session tunnel may be in a one-to-one correspondence with the multicast/broadcast service, in other words, one multicast/broadcast service corresponds to one multicast/broadcast session tunnel (Per MB service). One multicast/broadcast service may include one or more multicast/broadcast service flows, a plurality of multicast/broadcast service flows may correspond to one or more multicast/broadcast QoS flows, and one multicast/broadcast session may include one or more multicast/broadcast QoS flows.

4. Multicast/Broadcast Service

A multicast/broadcast service may be described by using information about the multicast/broadcast service. The information about the multicast/broadcast service includes at least description information of the multicast/broadcast service. The description information of the multicast/broadcast service may include description information of one or more multicast/broadcast service flows. The description information about the multicast/broadcast service flow includes at least one of the following: a quality of service identifier (QoS flow identifier, QFI) that the multicast/broadcast service flow needs to have, feature information of the multicast/broadcast service flow (such as a destination address, a target port number, or a source address of the multicast/broadcast service flow), and a QoS requirement (such as jitter, a delay, a packet loss rate, or a bandwidth) of the multicast/broadcast service flow. The QoS requirement of the multicast/broadcast service flow is used to establish a multicast/broadcast QoS flow. In addition to the description information of the multicast/broadcast service, the information about the multicast/broadcast service may further include information about a terminal device, for example, may include an identifier of one or more terminal devices that are allowed (or request) to join the multicast/broadcast service, an identifier of a terminal device group, and the like.

5. Multicast/Broadcast Session

A multicast/broadcast session includes a unicast tunnel between network elements, a multicast tunnel, an air interface radio bearer in a unicast mode, or an air interface radio bearer in a multicast/broadcast mode. It should be noted that the multicast/broadcast session may be used to send multicast service data to a terminal device, or may be used to send broadcast service data to a terminal device. This is not limited in this embodiment of this application.

6. PDU Session Tunnel

A PDU session tunnel corresponds to a UE, and service data in the PDU session tunnel may be transmitted in a form of a unicast QoS flow. In this application, the PDU session tunnel may be further used to transmit a unicast QoS flow to which a multicast/broadcast QoS flow corresponding to a multicast/broadcast service is mapped.

It should be noted that the PDU session is at a UE level, and the multicast/broadcast session is at a service level. One PDU session of one UE may be associated with a plurality of multicast/broadcast services. In other words, the UE may join at least one multicast/broadcast service by using the PDU session. One multicast/broadcast session may serve one multicast/broadcast service. One multicast/broadcast session includes a unicast tunnel or a multicast tunnel from a data network to a core network device and then to an access network device, and a unicast air interface resource or a multicast/broadcast air interface resource that is allocated by the access network device and that is used to send the multicast/broadcast service.

The foregoing describes some terms in this application, and the following describes technical features in this application. It should be noted that these explanations are either not intended to limit the protection scope claimed in this application.

Figure 2:
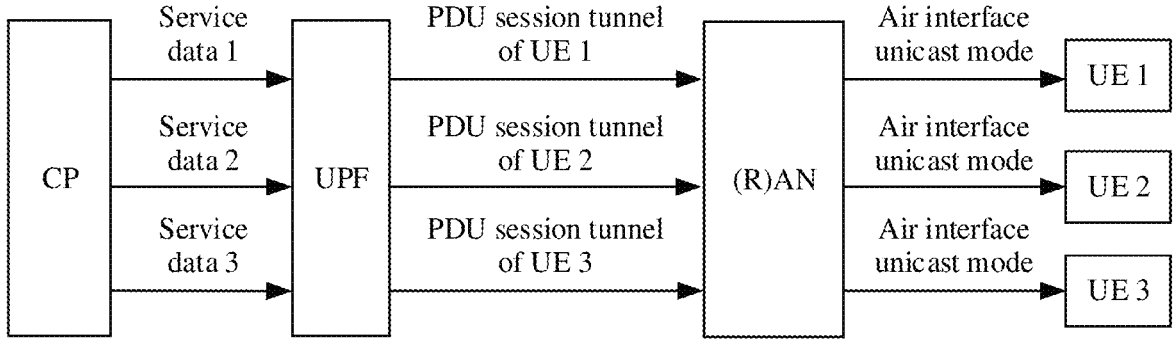
FIG. 2 is a schematic diagram of transmitting data in a unicast manner according to this application.

FIG. 2 is a schematic diagram of transmitting data in a unicast manner. A transmission procedure shown in FIG. 2 may be used to transmit both unicast service data and multicast/broadcast service data.

In FIG. 2, each of a UE 1, a UE 2, and a UE 3 corresponds to a different PDU session. A service provider (CP/SP) may separately send respective service data to the UE 1, the UE 2, and the UE 3 by using three PDU sessions. It should be understood that service data of three UEs is different, a target address may be an IP address of each UE, and the service data of each UE may be separately sent to each UE through an independent transmission path of each UE. Specifically, a service transmission path from the CP/SP to a RAN may include a transmission path between the CP/SP and a UPF and a transmission path between the UPF and the RAN. The transmission path between the UPF and the RAN may be referred to as a PDU session tunnel, and different PDU sessions have different PDU session tunnels. On an air interface, the RAN may separately send the service data to the UE 1, the UE 2, and the UE 3 in a unicast manner, that is, in a PTP manner.

Figure 3:
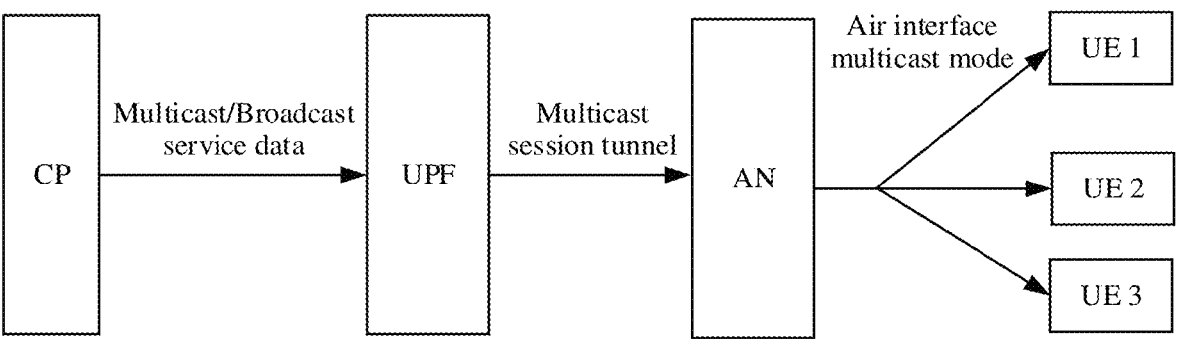
FIG. 3 is a schematic diagram of transmitting data in a multicast manner according to this application.

FIG. 3 is a schematic diagram of transmitting data in a multicast/broadcast manner. A transmission procedure shown in FIG. 3 may be used to transmit multicast/broadcast service data.

In FIG. 3, the multicast/broadcast service data may be sent from a CP/SP to a UE 1, a UE 2, and a UE 3. A multicast/broadcast service transmission path from the CP/SP to a RAN may include: a transmission path between the CP and a UPF and a transmission path between the UPF and the RAN. The transmission path between the UPF and the RAN may use a tunnel to transmit the multicast/broadcast service data, for example, use a tunnel according to a general tunnel protocol (general tunnel protocol, GTP). The transmission path between the UPF and the RAN may be referred to as a multicast/broadcast session tunnel, and the multicast/broadcast session tunnel is shared by the UE 1, the UE 2, and the UE 3. On an air interface, the RAN may send the multicast/broadcast service data to the UE 1, the UE 2, and the UE 3 in a PTM manner. To be specific, the RAN needs to send only one piece of data, and the UE 1, all of the UE 2, and the UE 3 may receive the piece of data.

In a multicast manner, the service data may be transmitted to all target nodes at a time, or service data may be transmitted only to a specific object. Therefore, in the multicast manner, point-to-multipoint transmission may be implemented between one sending node and a plurality of reception nodes. This resolves a problem of low efficiency of a unicast manner.

The foregoing provides related descriptions of unicast and multicast. It may be understood that, that an access network device supports a multicast/broadcast function may be understood as that the access network device supports in transmitting the multicast/broadcast service data in a multicast/broadcast manner. Alternatively, that an access network device does not support a multicast/broadcast function may be understood as that the access network device does not support in transmitting the multicast/broadcast service data in a multicast/broadcast manner, or the access network device supports in transmitting the multicast/broadcast service data or PDU session data only in a unicast manner. The access network device that does not support the multicast/broadcast function may send a multicast/broadcast service to a terminal device by using a PDU session, in other words, map the multicast/broadcast service to the PDU session. The access network device that supports the multicast/broadcast function may receive multicast/broadcast service data from a core network through the multicast/broadcast session tunnel, and send the multicast/broadcast service data to a plurality of terminal devices that join the multicast/broadcast service. It should be understood that, after reaching the RAN, the multicast/broadcast service data is processed by a service data adaptation protocol (service data adaptation protocol, SDAP) layer, a packet data convergence protocol (packet data convergence protocol, PDCP) layer, a radio link control (radio link control, RLC) layer, a media access control (media access control, MAC) layer, and a physical layer (physical, PHY) of the RAN, and then is sent to each UE that receives the multicast/broadcast service data.

Figure 4:
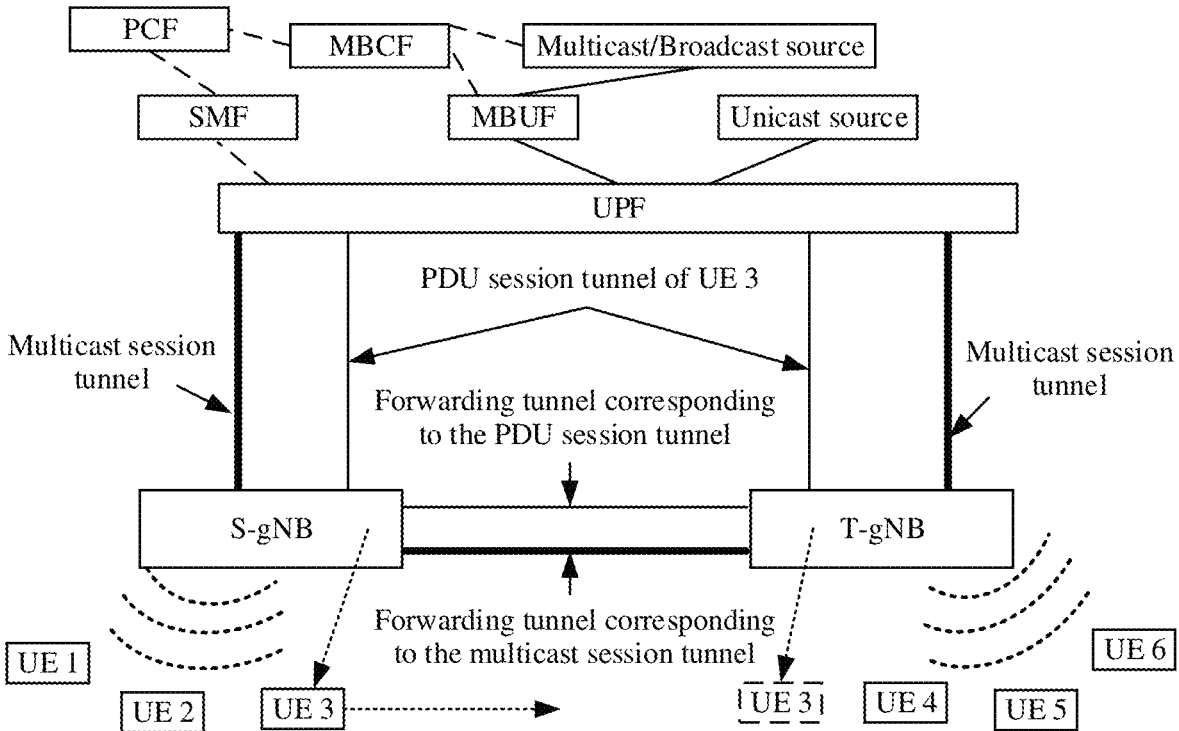
FIG. 4 is a schematic diagram of an application scenario according to this application.

Based on the foregoing content, FIG. 4 shows an example of a scenario to which this application is applicable. It should be noted that the system architecture and the application scenario described in this application are intended to describe the technical solutions in this application more clearly, but are not intended to limit the technical solutions provided in this application. A person of ordinary skill in the art may know that as the system architecture evolves and a new scenario emerges, the technical solutions provided in this application are also applicable to a similar technical problem.

As shown in FIG. 4, a source base station (source g-NB, S-gNB) supports a multicast/broadcast function (or referred to as supporting a multicast/broadcast service), and a target base station (target g-NB, T-gNB) supports the multicast/broadcast function. To be specific, the S-gNB may send data of the multicast/broadcast service to all of a UE 1, a UE 2, and a UE 3, and the T-gNB may send the data of the multicast/broadcast service to all of a UE4, a UE5 and a UE6. Because the S-gNB and the T-gNB support the multicast/broadcast function, a multicast/broadcast session tunnel may be established between the UPF and the S-gNB, or a multicast/broadcast session tunnel may be established between the UPF and the T-gNB, so that the data of the multicast/broadcast service is delivered to the S-gNB and the T-gNB through the multicast/broadcast session tunnels. In FIG. 4, an example in which the UE 3 performs handover, and a forwarding tunnel corresponding to a PDU session tunnel of the UE 3 and a forwarding tunnel corresponding to a multicast/broadcast session tunnel are established between the T-gNB and the S-gNB is used for description. Certainly, only the forwarding tunnel corresponding to the PDU session tunnel of the UE 3 may alternatively be established between the T-gNB and the S-gNB. For a PDU session of the UE 3 that is handed over from the S-gNB to the T-gNB, during handover, an SMF and an anchor (for example, the UPF in FIG. 4) that serve the PDU session of the UE 3 remain unchanged. In FIG. 4, multicast/broadcast network elements that serve a multicast/broadcast service of the S-gNB are an MBCF and an MBUF. The MBUF may be connected to the anchor UPF in which the PDU session of the UE 3 is located, or may be directly connected to the S-gNB, or may be connected to the S-gNB by a non-anchor UPF. This is not limited in this embodiment of this application. For a multicast/broadcast service related to the PDU session of the UE 3 that is handed over, network elements that serve the multicast/broadcast service may be the MBCF and the MBUF, or may be another MBCF and another MBUF. The MBUF may be directly connected to the T-gNB, or may be connected to the anchor UPF of the PDU session of the UE 3 that is handed over, or may be connected to the T-gNB by another non-anchor UPF. This is not limited in this embodiment of this application.

It should be noted that, if a source base station (source g-NB, S-gNB) does not support a multicast/broadcast function, but a target base station (target g-NB, T-gNB) supports the multicast/broadcast function, a multicast/broadcast session tunnel may be established between the UPF and the T-gNB, and there is no multicast/broadcast session tunnel between the UPF and the S-gNB; and only a forwarding tunnel corresponding to a PDU session tunnel is established between the T-gNB and the S-gNB. That is, in FIG. 4, there is no multicast/broadcast session tunnel between the UPF and the S-gNB, and there is no forwarding tunnel corresponding to a multicast/broadcast session tunnel between the T-gNB and the S-gNB. It should be noted that, if a source base station (source g-NB, S-gNB) supports a multicast/broadcast function, but a target base station (target g-NB, T-gNB) does not support the multicast/broadcast function, a multicast/broadcast session tunnel may be established between the UPF and the S-gNB, and there is no multicast/broadcast session tunnel between the UPF and the T-gNB; and only a forwarding tunnel corresponding to a PDU session tunnel is established between the T-gNB and the S-gNB. That is, in FIG. 4, there is no multicast/broadcast session tunnel between the UPF and the T-gNB, and there is no forwarding tunnel corresponding to a multicast/broadcast session tunnel between the T-gNB and the S-gNB.

When a multicast/broadcast service with the T-gNB is sending the data of the multicast/broadcast service to the UE 1, the UE 2, and the UE 3 through the multicast/broadcast session tunnel, the UE 3 is handed over from the S-gNB to the T-gNB. After the UE 3 is connected to the T-gNB, if the UE 3 is directly added to an air interface PTM mode of the T-gNB, it cannot be ensured that a speed of forwarding the data of the multicast/broadcast service from the S-gNB through the forwarding tunnel corresponding to the multicast/broadcast session tunnel is synchronous with a speed of delivering data of a same-source service from the T-gNB through the multicast/broadcast session tunnel, in other words, a speed at which each data packet in a same MB service reaches the S-gNB is not necessarily the same as a speed at which each data packet in the same MB service reaches the T-gNB. Therefore, data continuity of the UE 3 that currently performs handover or other UEs (namely, the UE 4, the UE 5, and the UE 6) that are receiving the multicast/broadcast service and that are served by the T-gNB is affected. For example, if the T-gNB sends, in an air interface PTM mode, data of the UE 3 received from the forwarding tunnel corresponding to the multicast/broadcast session tunnel, data packets originally received by the UE 4, the UE 5, and the UE 6 corresponding to the T-gNB may be out of order. If the T-gNB discards data of the UE 3 received from the forwarding tunnel corresponding to the multicast/broadcast session tunnel, a packet loss of the service data of the UE 3 occurs.

In view of this, this application provides a communication method. According to the method, it can be ensured that continuity of a multicast/broadcast service of a terminal device and another terminal device is not affected in a process in which the terminal device is handed over from a source access network device to a target access network device.

Figure 5:
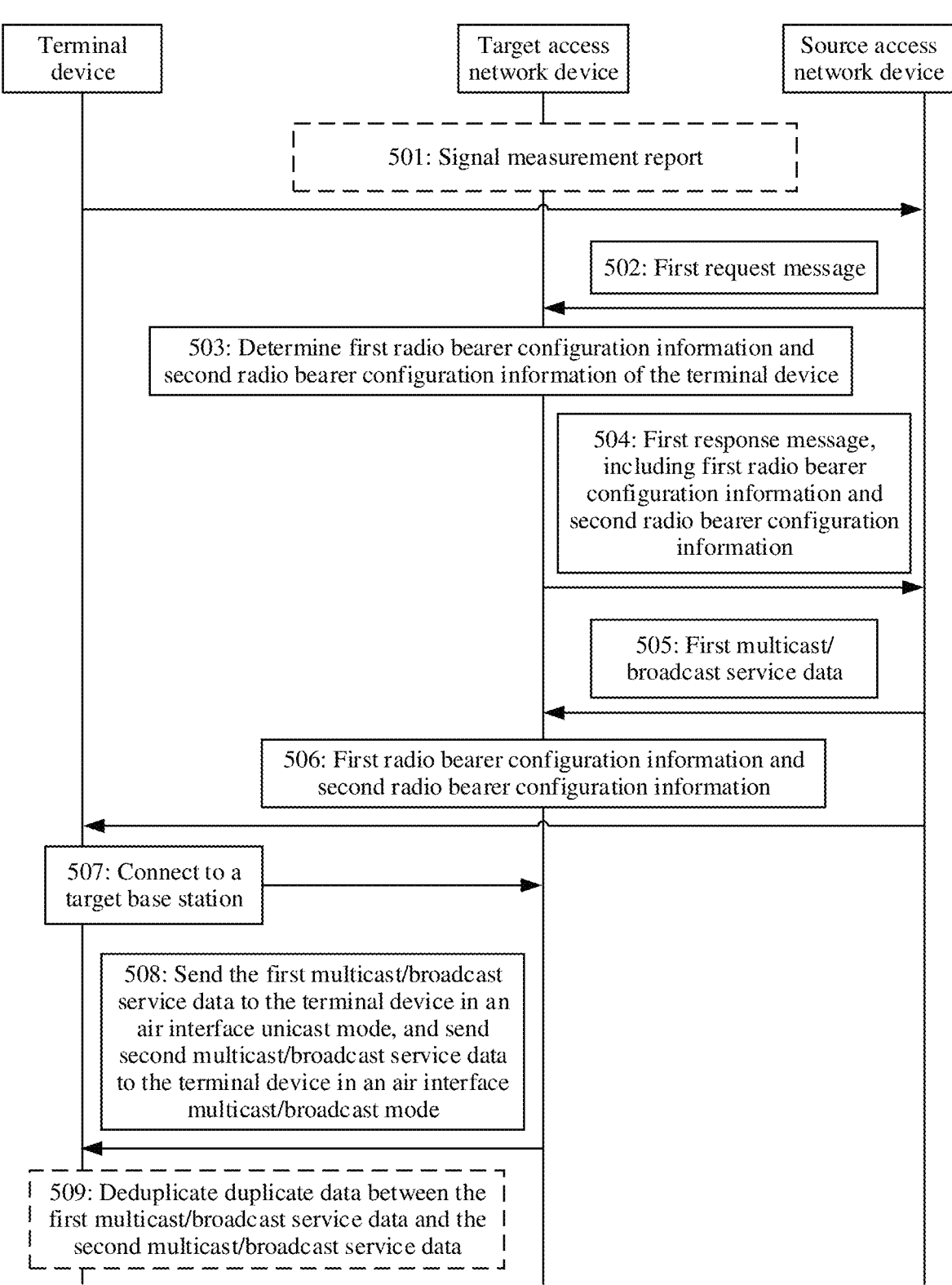
FIG. 5 is a schematic method flowchart of a communication method according to this application.

FIG. 5 shows a communication method according to this application. The communication method is applicable to the system architecture shown in FIG. 1. The method includes the following steps:

Step 501: The terminal device sends a measurement report to the source access network device. Correspondingly, the source access network device receives the measurement report from the terminal device.

This step 501 is an optional step. The measurement report may be a signal measurement report.

Step 502: When determining that the terminal device needs to be handed over to an access network device, the source access network device sends a first request message to the target access network device. Correspondingly, the target access network device receives the first request message from the source access network device.

Herein, the first request message may be used to request the target access network device to establish a forwarding tunnel corresponding to a first multicast/broadcast service with the source access network device. The first request message may be further used to request to hand over the terminal device from the source access network device to the target access network device.

In a possible implementation, the first request message includes PDU session information of the terminal device. The PDU session information includes: a PDU session identifier, QoS information corresponding to a service included in a PDU session, a multicast/broadcast service identifier associated with the PDU session, and multicast/broadcast QoS information corresponding to the multicast/broadcast service. Optionally, the QoS information corresponding to the service included in the PDU session includes: a unicast QFI and a QoS parameter corresponding to the unicast QFI. The QoS parameter corresponding to the unicast QFI is used by the source access network device to configure an air interface resource, and may be represented by a 5QI. The multicast/broadcast QoS information corresponding to the multicast/broadcast service includes a multicast QFI and a QoS parameter corresponding to the multicast QFI.

It should be understood that the multicast/broadcast service identifier associated with the PDU session includes, but is not limited to, a multicast/broadcast service identifier stored in a context of the PDU session, and a multicast/broadcast service identifier corresponding to the PDU session identifier.

Step 503: The target access network device determines first radio bearer configuration information and second radio bearer configuration information of the terminal device.

Herein, the first radio bearer configuration information is used by the terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The first radio bearer configuration information may include a cell radio network temporary identifier (cell radio network temporary identifier, C-RNTI), and the second radio bearer configuration information may include a group radio network temporary identifier (group radio network temporary identifier, G-RNTI). The air interface unicast mode is also referred to as an air interface point-to-point mode, and the air interface multicast/broadcast mode is also referred to as an air interface point-to-multipoint mode.

In a possible implementation, the target access network device may allocate the first radio bearer configuration information and the second radio bearer configuration information to the terminal device. Further, optionally, the target access network device may further determine a radio resource of the terminal device based on the QoS information corresponding to the service included in the PDU session of the terminal device and the multicast/broadcast QoS information corresponding to the multicast/broadcast service. For example, the target access network device may determine, based on a QoS parameter corresponding to each unicast QFI and a QoS parameter corresponding to each multicast QFI in the first request message, a quantity of air interface data radio bearers (data radio bearers, DRB s) and a mapping relationship between the QFI and the DRB.

Step 504: The target access network device sends a first response message to the source access network device. Correspondingly, the source access network device receives the first response message from the target access network device.

Herein, the first response message may include first radio bearer configuration information and second radio bearer configuration information.

In a possible implementation, the first response message may further include a QFI that corresponds to the QoS flow and that is supported by the target access network device to forward.

Step 505: The source access network device sends first multicast/broadcast service data to the target access network device.

Herein, the first multicast/broadcast service data is associated with the PDU session of the terminal device. Further, optionally, for a manner in which the source access network device forwards the first multicast/broadcast service data that needs to be forwarded, refer to the following implementation 1 and implementation 2. Details are not described herein again.

It should be noted that step 505 may alternatively be performed after step 506 and before step 507.

Step 506: The source access network device sends the first radio bearer configuration information and the second radio bearer configuration information to the terminal device. Correspondingly, the terminal device receives the first radio bearer configuration information and the second radio bearer configuration information from the source access network device.

Herein, after the source access network device sends the first radio bearer configuration information and the second radio bearer configuration information to the terminal device, an air interface connection between the terminal device and the source access network device is disconnected. In this case, a PDU session tunnel of the terminal device in the source access network device stops sending the data of the service included in the PDU session to the terminal device, and a multicast/broadcast session tunnel of the source access network device stops sending the multicast/broadcast service data to the terminal device. It should be noted that another terminal device that is connected to the source access network device may still normally receive the multicast/broadcast service data whose sending to the terminal device is stopped.

It should be noted that there is no sequence between step 505 and step 506. Step 505 may be performed before step 506, or step 506 may be performed before step 505, or step 505 and step 506 may be simultaneously performed.

Step 507: The terminal device is connected to the target access network device.

Step 508: The target access network device sends the first multicast/broadcast service data to the terminal device in an air interface unicast mode, and sends second multicast/broadcast service data to the terminal device in an air interface multicast/broadcast mode or an air interface unicast mode. Correspondingly, the terminal device receives the first multicast/broadcast service data in an air interface unicast mode, and receives the second multicast/broadcast service data in an air interface multicast/broadcast mode or an air interface unicast mode.

It may also be understood as that the terminal device may receive the first multicast/broadcast service data based on the first radio bearer configuration information, and receive the second multicast/broadcast service data based on the second radio bearer configuration information.

Step 509: The terminal device deduplicates duplicate data between the first multicast/broadcast service data and the second multicast/broadcast service data.

In a possible implementation, the first multicast/broadcast service data cached by the terminal device in the target access network device needs to be sent to the terminal device in an air interface unicast mode. Therefore, after being connected to the target access network device, the terminal device receives both the first multicast/broadcast service data sent in an air interface unicast mode and the second multicast/broadcast service data sent in an air interface multicast/broadcast mode or an air interface unicast mode. Therefore, for the multicast/broadcast service associated with the PDU session, the terminal device may receive duplicate service data (to be specific, a speed at which same-source multicast/broadcast service data reaches the source access network device and is forwarded to the target access network device is greater than a speed at which the same-source multicast/broadcast service data reaches the target access network device). Consequently, the terminal device may receive the duplicate data. A TCP/UDP layer may autonomously perform deduplication on a duplicate data packet received by the terminal device.

Figure 6:
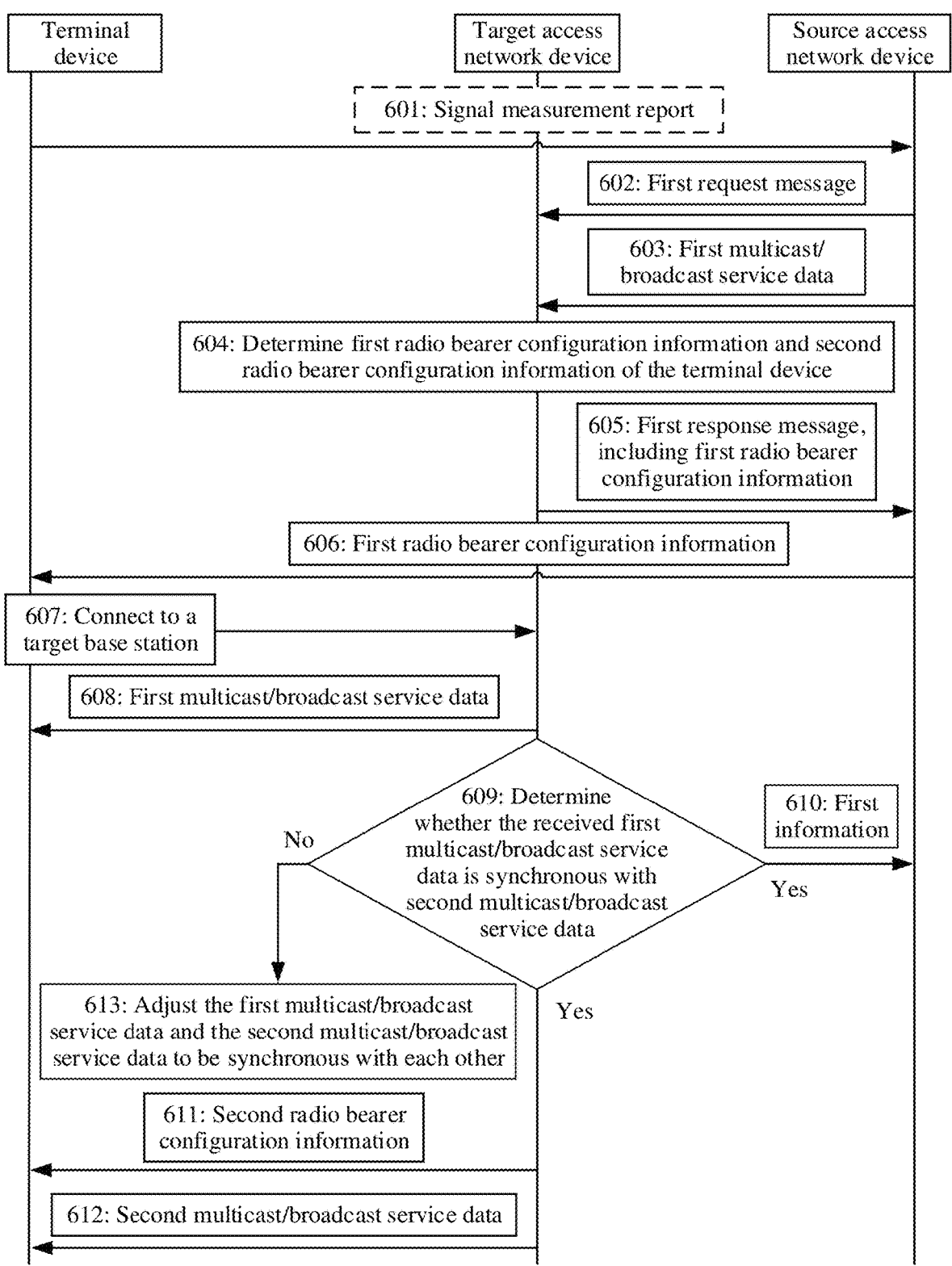
FIG. 6 is a schematic method flowchart of another communication method according to this application.

FIG. 6 shows another communication method according to this application. The communication method is applicable to the system architecture shown in FIG. 1. The method includes the following steps:

Step 601: The terminal device sends a measurement report to the source access network device. Correspondingly, the source access network device receives the measurement report from the terminal device.

For step 601, refer to the description of step 501.

Step 602: When determining that the terminal device needs to be handed over to an access network device, the source access network device sends a first request message to the target access network device. Correspondingly, the target access network device receives the first request message from the source access network device.

The first request message in step 602 may be the same as the first request message in step 502. For step 602, refer to the description of step 502. Details are not described herein again.

Step 603: The source access network device sends first multicast/broadcast service data to the target access network device.

Herein, the first multicast/broadcast service data is associated with a PDU session of the terminal device. Further, optionally, for a manner in which the source access network device forwards the first multicast/broadcast service data that needs to be forwarded, refer to the following implementation 1 and implementation 2. Details are not described herein again.

It should be noted that step 603 may alternatively be performed after step 606 and before step 607.

In a possible implementation, the first multicast/broadcast service data is associated with the PDU session of the terminal device. Further, optionally, for a manner in which the source access network device forwards the first multicast/broadcast service data that needs to be forwarded, refer to the implementation 1 and the implementation 2 in the following case 1. Details are not described herein again. Correspondingly, the target access network device may receive the first multicast/broadcast service data from the source access network device.

Step 604: The target access network device determines first radio bearer configuration information and second radio bearer configuration information of the terminal device.

Herein, the first radio bearer configuration information is used by the terminal device to receive the first multicast/ broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. Alternatively, it may also be understood as that the first radio bearer configuration information is used by the terminal device to receive the first multicast/broadcast service data sent by the target access network device, and the second radio bearer configuration information is used by the terminal device to receive the second multicast/broadcast service data sent by the target access network device. The first radio bearer configuration information may include a C-RNTI, and the second radio bearer configuration information may include a G-RNTI.

It should be noted that the target access network device may first determine the first radio bearer configuration information, or may first determine the second radio bearer configuration information, or may simultaneously determine the first radio bearer configuration information and the second radio bearer configuration information. This is not limited in this application.

Step 605: The target access network device sends a first response message to the source access network device. Correspondingly, the source access network device receives the first response message from the target access network device.

Herein, the first response message may include the first radio bearer configuration information. For the first radio bearer configuration information, refer to the foregoing related descriptions. Details are not described herein again.

In a possible implementation, the first response message may further include a QFI that corresponds to a quality of service (quality of service, QoS) flow and that is supported by the target access network device to forward.

Step 606: The source access network device sends first radio bearer configuration information to the terminal device. Correspondingly, the terminal device receives the first radio bearer configuration information from the source access network device.

Step 607: The terminal device is connected to the target access network device.

Step 608: The target access network device sends the first multicast/broadcast service data to the terminal device in an air interface unicast mode. Correspondingly, the terminal device receives the first multicast/broadcast service data from the target access network device in an air interface unicast mode.

In other words, the target access network device sends the first multicast/broadcast service data to the terminal device. Correspondingly, the terminal device receives the first multicast/broadcast service data from the target access network device. Herein, the terminal device may receive the first multicast/broadcast service data from the target access network device by using the first radio bearer configuration information.

Step 609: The target access network device determines whether the received first multicast/broadcast service data is synchronous with the second multicast/broadcast service data. If the received first multicast/broadcast service data is synchronous with the second multicast/broadcast service data, the target access network device performs step 610 and step 612; or if the received first multicast/broadcast service data is not synchronous with the second multicast/broadcast service data, the target access network device performs step 613.

It should be noted that step 610 and step 612 may be simultaneously performed, or step 610 is performed before step 612, or step 612 is performed before step 610.

Herein, alternatively, after determining that the first multicast/broadcast service data is earlier than the second multicast/broadcast service data, the target access network device may perform step 610. It should be understood that this manner may be an implementation parallel to step 609.

It should be noted that a speed at which same-source multicast/broadcast service data reaches the target access network device through a forwarding tunnel corresponding to a first multicast/broadcast session tunnel of the source access network device is different from a speed at which the same-source service data reaches the target access network device through a multicast/broadcast session tunnel of the target access network device. Consequently, the target access network device may determine that the received first multicast/broadcast service data is not synchronous with the second multicast/broadcast service data.

In a possible implementation, the target access network device may determine, based on a sequence number of the received first multicast/broadcast service data and a sequence number of the received second multicast/broadcast service data, whether the first multicast/broadcast service data is synchronous with the second multicast/broadcast service data. Further, optionally, the sequence number may also be referred to as a serial number. The sequence number of the multicast/broadcast service data (for example, the first multicast/broadcast service data or the second multicast/ broadcast service data) may be a sequence number in a user plane (user plane) data packet header of a general tunnel protocol (general tunnel protocol, GTP), namely, the sequence number in the GTP-U header.

The following provides examples of two manners of determining whether the first multicast/broadcast service data is synchronous with the second multicast/broadcast service data.

Manner 1: If determining that the sequence number of the first multicast/broadcast service data plus one is greater than or equal to the sequence number of the second multicast/broadcast service data, the target access network device determines that the first multicast/broadcast service data is synchronous with the second multicast/broadcast service data.

For example, for a same-source multicast/broadcast service, a sequence number of first multicast/broadcast service data received by the target access network device (a service data packet that reaches the target access network device through a forwarding tunnel) is X, and a sequence number of second multicast/broadcast service data of the same-source service received by the target access network device from the core network device (a service data packet that reaches the target access network device through a multicast/broadcast session tunnel of the target access network device) is Y. When $X+1 \geq Y$, it is determined that the first multicast/broadcast service data is synchronous with the second multicast/broadcast service data.

Further, optionally, when $X+1=Y$, the first multicast/broadcast service data and the second multicast/broadcast service data that are received by the target access network device are exactly losslessly transferred. When $X+1>Y$, there is duplicate data between the first multicast/broadcast service data and the second multicast/broadcast service data that are received by the target access network device. In a possible implementation, the target access network device discards the first multicast/broadcast service data whose sequence number of the first multicast/broadcast service data plus one is greater than the sequence number of the second multicast/broadcast service data.

If determining that the sequence number of the first multicast/broadcast service data plus one is less than the sequence number of the second multicast/broadcast service data, the target access network device may determine that the first multicast/broadcast service data is not synchronous with the second multicast/broadcast service data.

Manner 2: If determining that the sequence number of the first multicast/broadcast service data is greater than or equal to the sequence number of the second multicast/broadcast service data, the target access network device determines that the first multicast/broadcast service data is synchronous with the second multicast/broadcast service data.

In a possible implementation, if determining that the sequence number of the first multicast/broadcast service data is greater than or equal to the sequence number of the second multicast/broadcast service data, the target access network device determines that the first multicast/broadcast service data is synchronous with the second multicast/broadcast service data. For example, for the same-source multicast/broadcast service, at a same moment, a sequence number of first multicast/broadcast service data received by the target access network device (namely, a service data packet that reaches the target access network device through a forwarding tunnel) is X, and for the same-source service, at the same moment, a sequence number of received second multicast/broadcast service data (namely, a service data packet that reaches the target access network device through a multicast/broadcast session tunnel of the target access network device) is Y. When $X=Y$, it is determined that the first multicast/broadcast service data is synchronous with the second multicast/broadcast service data, and it indicates that for the same-source multicast/broadcast service, a speed of reaching the target access network device by the first multicast/broadcast service data through the forwarding tunnel corresponding to the first multicast/broadcast session tunnel of the source access network device is equal to a speed of receiving the second multicast/broadcast service data by the target access network device through the multicast/broadcast session tunnel. When $X>Y$, it indicates that the first multicast/broadcast service data is earlier than the second multicast/broadcast service data, and for the same-source multicast/broadcast service, a speed of reaching the target access network device by the first multicast/broadcast service data through the forwarding tunnel corresponding to the first multicast/broadcast session tunnel of the source access network device is greater than a speed of receiving the second multicast/broadcast service data by the target access network device through the multicast/broadcast session tunnel. Herein, the target access network device may also determine that the first multicast/broadcast service data is synchronous with the second multicast/broadcast service data.

If the target access network device determines that the sequence number of the first multicast/broadcast service data is greater than the sequence number of the second multicast/broadcast service data, and it indicates that for the same-source multicast/broadcast service, a speed of reaching the target access network device by the first multicast/broadcast service data through the forwarding tunnel corresponding to the first multicast/broadcast session tunnel of the source access network device is greater than a speed of receiving the second multicast/broadcast service data by the target access network device through the multicast/broadcast session tunnel, a sending rate of the second multicast/broadcast service data may be increased, and/or a sending rate of the first multicast/broadcast service data may be decreased.

Step 610: The target access network device sends first information to the source access network device.

Herein, the first information indicates the source access network device to stop sending the first multicast/broadcast service data to the target access network device, or indicates to the source access network device that the first multicast/broadcast service data received by the target access network device is synchronous with the second multicast/broadcast service data.

In a possible implementation, the first information may be a data packet, and the data packet may be sent through a forwarding tunnel between the target access network device and the source access network device. In another possible implementation, the first information may be signaling.

This step 610 is an optional step. In another possible implementation, a ninth timer is set in the source access network device. When the ninth timer expires, the source access network device stops sending the first multicast/broadcast service data to the target access network device. Duration of the ninth timer may be set based on an actual situation, for example, may be tens of milliseconds or several seconds.

Step 611: The target access network device sends the second radio bearer configuration information to the terminal device. Correspondingly, the terminal device receives the second radio bearer configuration information from the target access network device.

It should be noted that step 611 may be performed after step 609 and before step 612, or may be performed after step 604 and before step 609. This is not limited in this application.

Step 612: The target access network device sends the second multicast/broadcast service data to the terminal device in an air interface multicast/broadcast mode or an air interface unicast mode. Correspondingly, the terminal device receives the second multicast/broadcast service data in an air interface multicast/broadcast mode or an air interface unicast mode.

It may also be understood as that, that the target access network device sends the second multicast/broadcast service data to the terminal device may include: sending the second multicast/broadcast service data to the terminal device in an air interface unicast mode, or sending the second multicast/broadcast service data to the terminal device in an air interface multicast/broadcast mode. Correspondingly, the terminal device may receive the first multicast/broadcast service data based on the first radio bearer configuration information, and receive the second multicast/broadcast service data based on the second radio bearer configuration information.

Step 613: The target access network device adjusts the first multicast/broadcast service data and the second multicast/broadcast service data to be synchronous with each other.

In a possible implementation, when determining that the sequence number of the first multicast/broadcast service data plus one is less than the sequence number of the second multicast/broadcast service data, the target access network device may cache the second multicast/broadcast service data. If determining that the sequence number of the received first multicast/broadcast service data plus one is equal to a sequence number of the $1^{st}$ cached second multicast/broadcast service data, the target access network device may determine that the first multicast/broadcast service data is synchronous with the second multicast/broadcast service data. Further, optionally, after determining that the first multicast/broadcast service data is synchronous with the second multicast/broadcast service data, the target access network device may perform step 610 and step 612.

Further, optionally, if determining that the sequence number of the first multicast/broadcast service data plus one is less than the sequence number of the second multicast/broadcast service data, the target access network device may decrease a sending rate of the second multicast/broadcast service data, and/or increase a sending rate of the first multicast/broadcast service data. In this way, synchronization between the first multicast/broadcast service data and the second multicast/broadcast service data can be quickly implemented.

If the target access network device determines that the received first multicast/broadcast service data is later than the second multicast/broadcast service data, for example, determines that the sequence number of the first multicast/broadcast service data is less than the sequence number of the second multicast/broadcast service data, and it indicates that for the same-source multicast/broadcast service, a speed of reaching the target access network device by the first multicast/broadcast service data through the forwarding tunnel corresponding to the first multicast/broadcast session tunnel of the source access network device is less than a speed of receiving the second multicast/broadcast service data by the target access network device through the multicast/broadcast session tunnel, a sending rate of the second multicast/broadcast service data in an air interface unicast mode may be decreased, and/or a sending rate of the first service data in an air interface multicast/broadcast mode or an air interface unicast mode may be increased.

It should be noted that, if duration between step 605 and step 611 in FIG. 6 approaches 0, the method shown in FIG. 6 may be the same as the method shown in FIG. 5.

The following describes in detail in the following three cases based on whether the source access network device and the target access network device support a multicast/broadcast function.

Case 1: The target access network device supports the multicast/broadcast function, and the source access network device supports the multicast/broadcast function.

Based on this case 1, a forwarding tunnel corresponding to a PDU session tunnel of the terminal device may be established between the target access network device and the source access network device; or a forwarding tunnel corresponding to a PDU session tunnel of the terminal device and a forwarding tunnel corresponding to the first multicast/broadcast session may be established.

The following provides examples of three implementations in which the source access network device sends the first multicast/broadcast service data to the target access network device.

Implementation 1: The forwarding tunnel corresponding to the PDU session tunnel of the terminal device is used.

In a possible implementation, the source access network device may send first multicast/broadcast service data to the target access network device through the forwarding tunnel corresponding to the PDU session tunnel of the terminal device. Correspondingly, the target access network device may cache the received first multicast/broadcast service data.

It should be noted that in this implementation 1, the first multicast/broadcast service data may be mapped to a unicast QoS flow. To be specific, the source access network device may send, to the target access network device through the forwarding tunnel corresponding to the PDU session tunnel of the terminal device, the unicast QoS flow to which the first multicast/broadcast service data is mapped. Further, optionally, the source access network device may first replicate the first multicast/broadcast service data, map the first multicast/broadcast service data to the unicast QoS flow, and then send the unicast QoS flow through the forwarding tunnel corresponding to the PDU session tunnel of the terminal device. In this way, this helps avoid affecting service continuity of another terminal device that receives the first multicast/broadcast service data.

Based on this implementation 1, in a possible implementation, the first request message in step 502 includes identifier information of the forwarding tunnel corresponding to the PDU session tunnel of the terminal device. Correspondingly, the first response message in step 504 may also include the identifier information of the forwarding tunnel corresponding to the PDU session tunnel of the terminal device, so that the forwarding tunnel corresponding to the PDU session tunnel is established between the target access network device and the source access network device. Further, optionally, the first request message includes only unicast QFIs corresponding to the unicast QoS flows, and these unicast QFIs include unicast QFIs for mapping the multicast/broadcast QoS flows of the first multicast/broadcast QoS service to the unicast QoS flows. Alternatively, it may also be understood as that QoS information of a multicast/broadcast service includes a unicast QFI to which a multicast/broadcast QFI is mapped and a QoS parameter corresponding to the unicast QFI to which the multicast/broadcast QFI is mapped.

Implementation 2: The forwarding tunnel corresponding to the first multicast/broadcast session is used.

In a possible implementation, the source access network device may send the first multicast/broadcast service data to the target access network device through the forwarding tunnel corresponding to the first multicast/broadcast session. Correspondingly, the target access network device may cache the received first multicast/broadcast service data.

It should be noted that in this implementation 2, the source access network device may send, to the target access network device through the forwarding tunnel corresponding to the first multicast/broadcast session, a multicast/broadcast QoS flow included in a first multicast/broadcast service. Further, optionally, the first request message may include a multicast/broadcast QFI corresponding to the multicast/broadcast QoS flow.

Further, the source access network device may first replicate the first multicast/broadcast service data, and then send the first multicast/broadcast service data through the forwarding tunnel corresponding to the first multicast/broadcast session. In this way, this helps avoid affecting service continuity of another terminal device that receives the first multicast/broadcast service data.

Based on this implementation 2, in a possible implementation, the first request message in step 502 may include identifier information of the forwarding tunnel corresponding to the first multicast/broadcast session tunnel. Correspondingly, the first response message in step 504 may also include the identifier information of the forwarding tunnel corresponding to the first multicast/broadcast session tunnel, so that the forwarding tunnel corresponding to the first multicast/broadcast session tunnel is established the target access network device and the source access network device.

Case 2: The target access network device supports the multicast/broadcast function, and the source access network device does not support the multicast/broadcast function.

Based on this case 2, a forwarding tunnel corresponding to a PDU session tunnel may be established between the target access network device and the source access network device.

In a possible implementation, the source access network device may send first multicast/broadcast service data to the target access network device through the forwarding tunnel corresponding to the PDU session tunnel of the terminal device.

In this case 2, the first multicast/broadcast service data may be mapped to a unicast QoS flow. To be specific, the source access network device may send, to the target access network device through the forwarding tunnel corresponding to the PDU session tunnel of the terminal device, the unicast QoS flow to which the first multicast/broadcast service is mapped.

In a possible implementation, the first request message in step 502 includes identifier information of the forwarding tunnel corresponding to the PDU session tunnel of the terminal device. Correspondingly, the first response message in step 504 may also include the identifier information of the forwarding tunnel corresponding to the PDU session tunnel of the terminal device, so that the forwarding tunnel corresponding to the PDU session tunnel is established between the target access network device and the source access network device.

Based on the foregoing case 1 and case 2, a manner in which the source access network device stops sending the first multicast/broadcast service data to the target access network device may be that a first timer may be set in the source access network device. When determining that the first timer expires, the source access network device stops sending the first multicast/broadcast service data to the target access network device.

In a possible implementation, the first timer may be started at any moment when the source access network device starts to send the first multicast/broadcast service data to the target access network device or before the source access network device sends the first multicast/broadcast service data to the target access network device.

Figure 7A:
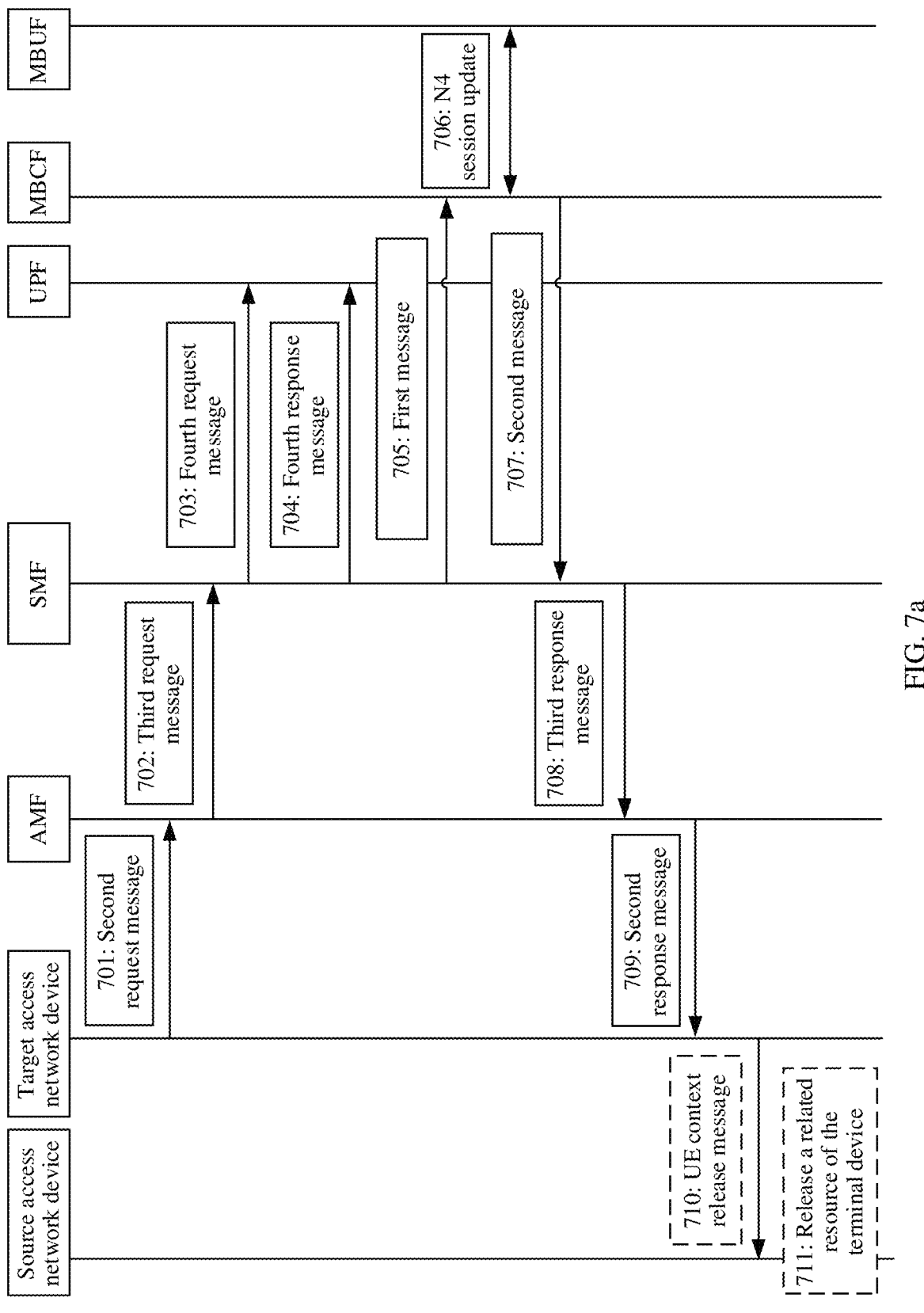
FIG. 7a is a schematic flowchart of a method for establishing a downlink data transmission tunnel between a target access network and a terminal device according to this application.
Figure 7B:
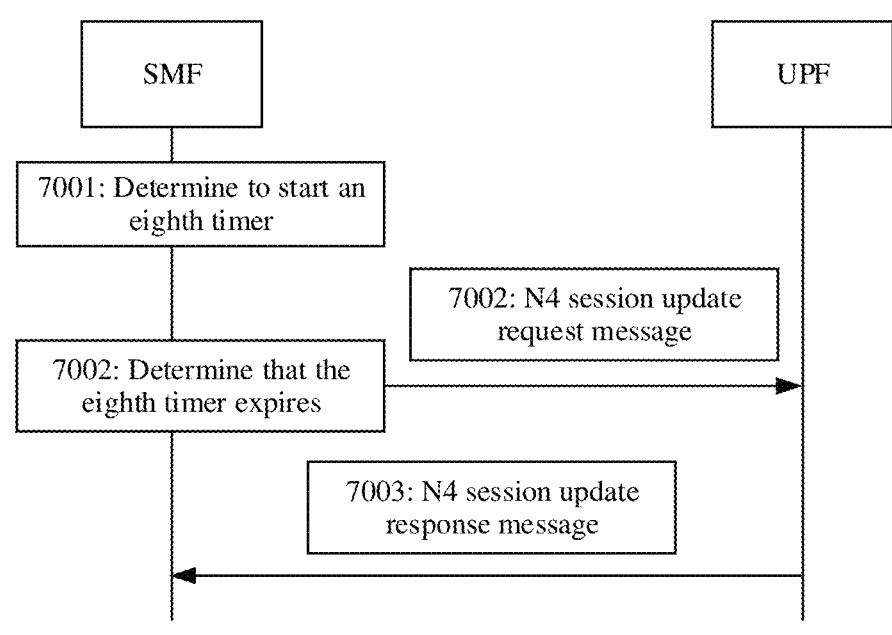
FIG. 7b is a schematic flowchart of another communication method according to this application.

Based on the foregoing case 1 and case 2, FIG. 7a shows a method for establishing a downlink data transmission tunnel between a target access network and a terminal device according to this application. The method includes the following steps:

Step 701: The target access network device sends a second request message to the AMF. Correspondingly, the AMF receives the second request message from the target access network device.

The second request message may be an N2 path handover request message, and may include a successfully forwarded QFI and an unsuccessfully forwarded QFI in the PDU session of the terminal device. The QFIs may be encapsulated in an N2 SM message. Further, the second request message may further include identifier information that is of a PDU session tunnel and that is allocated by the target access network device. Optionally, the handover request message may further include indication information indicating whether a multicast/broadcast service associated with the PDU session of the terminal device is running on the target access network device. It should be noted that if the associated multicast/broadcast service is not run on the target access network device (in other words, a multicast/broadcast session tunnel between the target access network device and the UPF is not established yet), the handover request message may further include identifier information that is of a multicast/broadcast session tunnel and that is allocated by the target access network device. If the multicast/broadcast service has been run on the target access network device, the handover request message does not include the identifier information that is of the multicast/broadcast session tunnel and that is allocated by the target access network device.

It should be noted that if the target access network device supports the multicast/broadcast function, the N2 path handover request message may include the identifier information of the PDU session tunnel of the terminal device and the identifier information of the multicast/broadcast session tunnel that are allocated by the target access network device. If the target access network device does not support the multicast/broadcast function, the N2 path handover request message may include the identifier information of the PDU session tunnel of the terminal device, in other words, does not include the identifier information of the multicast/broadcast session tunnel.

Step 702: The AMF sends a third request message to the SMF. Correspondingly, the SMF receives the third request message from the AMF.

The third request message may be a PDU session context update request message, and may include the information in step 602. Further, before handover, the AMF may collect capability information of the target access network device (that is, indicating whether the multicast/broadcast function is supported). Therefore, the AMF further sends the capability information of the target access network device to the SMF. Further, if the indication information indicating whether the multicast/broadcast service is running on the target access network device is included in step 701, the SMF may further learn whether the multicast/broadcast service associated with the PDU session of the terminal device is running on the target access network device.

Step 703: If a multicast/broadcast service is not run on the target access network device, the SMF sends a fourth request message to the UPF.

The fourth request message may be an N4 session update request message, may carry the identifier information that is of the PDU session tunnel and that is allocated by the target access network device and identifier information that is of a PDU session tunnel and that is allocated by the SMF to the UPF, and is used to establish a PDU session tunnel between the target access network device and the UPF. The fourth request message further carries the identifier information that is of the multicast/broadcast session tunnel and that is allocated by the target access network device, and is used to establish the multicast/broadcast session tunnel between the target access network device and the UPF.

Step 704: The UPF sends a fourth response message to the SMF.

Herein, if the fourth request message may be the N4 session update request message, the fourth response message is an N4 session update response message.

Step 705: The SMF sends a first message to the MBCF.

The first message is used to notify the MBCF that the terminal device has been handed over to the target access network device. Optionally, if a multicast/broadcast service data transmission tunnel between the MBUF and the UPF is not established yet, the first message may further include tunnel identifier information that is of the UPF and that is allocated by the SMF, in other words, the SMF may further notify the MBCF to establish the service data transmission tunnel between the MBUF and the UPF.

Step 706: The MBCF performs an N4 session update with the MBUF.

If the service data transmission tunnel is not established between the MBUF and the UPF yet, the MBCF sends, to the MBUF, the tunnel information that is of the UPF and that is allocated by the SMF in step 704 and tunnel identifier information allocated by the MBCF to the MBUF. The MBUF establishes the service data transmission tunnel between the MBUF and the UPF based on the tunnel information of the UPF and the tunnel identifier information of the MBUF.

Step 707: The MBCF sends a second message to the SMF. Correspondingly, the SMF receives the second message from the MBCF.

The second message may be used as a response message of the first message.

Step 708: The SMF sends a third response message to the AMF. Correspondingly, the AMF receives the third response message from the SMF.

The third response message may be a PDU session context update response message, and may include the identifier information that is of the PDU session tunnel and that is allocated by the SMF to the UPF. Further, the third response message tunnel may further include tunnel identifier information that is of a multicast/broadcast session and that is allocated by the SMF to the UPF.

Step 709: The AMF sends a second response message to the target access network device.

The second response message may be an N2 path handover response message, may include the identifier information that is of the PDU session tunnel and that is allocated by the SMF to the UPF, and may further include the tunnel identifier information that is of the multicast/broadcast session and that is allocated by the SMF to the UPF.

Step 710: The target access network device sends a UE context release message to the source access network device.

Correspondingly, the source access network device receives the UE context release message from the target access network device.

Step 711: The source access network device releases a related resource of the terminal device based on the UE context release message.

Through the foregoing step 701 to step 711, the downlink transmission tunnel between the target access network device and the terminal device may be established.

Case 3: The target access network device does not support the multicast/broadcast function, and the source access network device supports the multicast/broadcast function.

Based on this case 3, the source access network device sends first multicast/broadcast service data to the target access network device through a forwarding tunnel corresponding to a PDU session tunnel of the terminal device. Correspondingly, the target access network device may cache the received first multicast/broadcast service data. Specifically, the source access network device may map the first multicast/broadcast service data to a unicast QoS flow, and send, to the target access network device through the forwarding tunnel corresponding to the PDU session tunnel of the terminal device, the unicast QoS flow (which may include service data included in an original PDU session and multicast/broadcast service data mapped to the PDU session) to which the first multicast/broadcast service data is mapped.

It should be noted that in this case 3, the first request message in step 502 includes identifier information of the forwarding tunnel corresponding to the PDU session tunnel of the terminal device. Correspondingly, the first response message in step 504 may also include the identifier information of the forwarding tunnel corresponding to the PDU session tunnel of the terminal device, so that the forwarding tunnel corresponding to the PDU session tunnel is established between the target access network device and the source access network device. Further, optionally, the first request message includes only unicast QFIs corresponding to the unicast QoS flows, and these unicast QFIs include unicast QFIs for mapping the multicast/broadcast QoS flows of the first multicast/broadcast QoS service to the unicast QoS flows. QoS information of a multicast/broadcast service includes a unicast QFI to which a multicast/broadcast QFI is mapped and a QoS parameter corresponding to the unicast QFI to which the multicast/broadcast QFI is mapped.

In a possible implementation, the source access network device may first replicate the first multicast/broadcast service data, map the first multicast/broadcast service data to the unicast QoS flow, and then send the unicast QoS flow through the forwarding tunnel corresponding to the PDU session tunnel of the terminal device. In this way, this helps avoid affecting service continuity of another terminal device that receives the first multicast/broadcast service data.

FIG. 7_b_ shows another communication method according to this application. The method includes the following steps:

Step 7001: The SMF determines to start an eighth timer.

In a possible implementation, the session management network element sets the eighth timer to store second multicast/broadcast service data in the user plane network element. Further, optionally, the SMF may start the eighth timer in a case that a core network device sends the second multicast/broadcast service data to a target access network device. For a specific implementation in which the SMF determines to start the eighth timer, refer to the following implementation A, implementation B, implementation C, implementation D, implementation E, and implementation F.

Step 7002: The SMF sends a third message to the UPF after determining that the eighth timer expires.

In a possible implementation, the third message may be an N4 session update request message.

If the target access network device supports a multicast/broadcast function and a multicast/broadcast service has been run on the target access network device, the SMF sends the N4 session update request message to the UPF after determining that the eighth timer expires. The N4 session update request message may include identifier information that is of a PDU session tunnel and that is allocated by the target access network device and/or tunnel identifier information allocated by the SMF to the UPF, so that the PDU session tunnel between the UPF and the target access network device is established. It should be understood that duration of the eighth timer is set based on an actual situation, and is not limited herein. For example, the duration may be set to tens of milliseconds or several seconds, so that a packet loss of multicast/broadcast service data of a handed-over UE is reduced.

Step 7003: The UPF sends a response message of the third message to the SMF.

If the third message is the N4 session update request message, the third response message may be an N4 session update response message.

It should be noted that the UPF may allocate a PDU session tunnel identifier of the UPF, and the SMF may obtain, by using the N4 session update response message, the PDU session tunnel identifier allocated by the UPF.

Further, the SMF sends, to an MBCF, the PDU session tunnel identifier allocated by the UPF. The MBCF may send the PDU session tunnel identifier to an MBUF, and the MBUF may establish a tunnel with the anchor UPF. In this case, multicast/broadcast service data may reach the anchor UPF.

In a possible implementation, the SMF sends first indication information to the UPF, where the first indication information indicates the UPF to store the second multicast/broadcast service data.

In a possible implementation, when determining that the eighth timer expires, the SMF sends second indication information to the UPF, where the second indication information indicates the UPF to send the stored second multicast/broadcast service data to the target access network device.

Further, optionally, the N4 session update request message may include the first indication information or the second indication information.

Implementation A

Figure 7C:
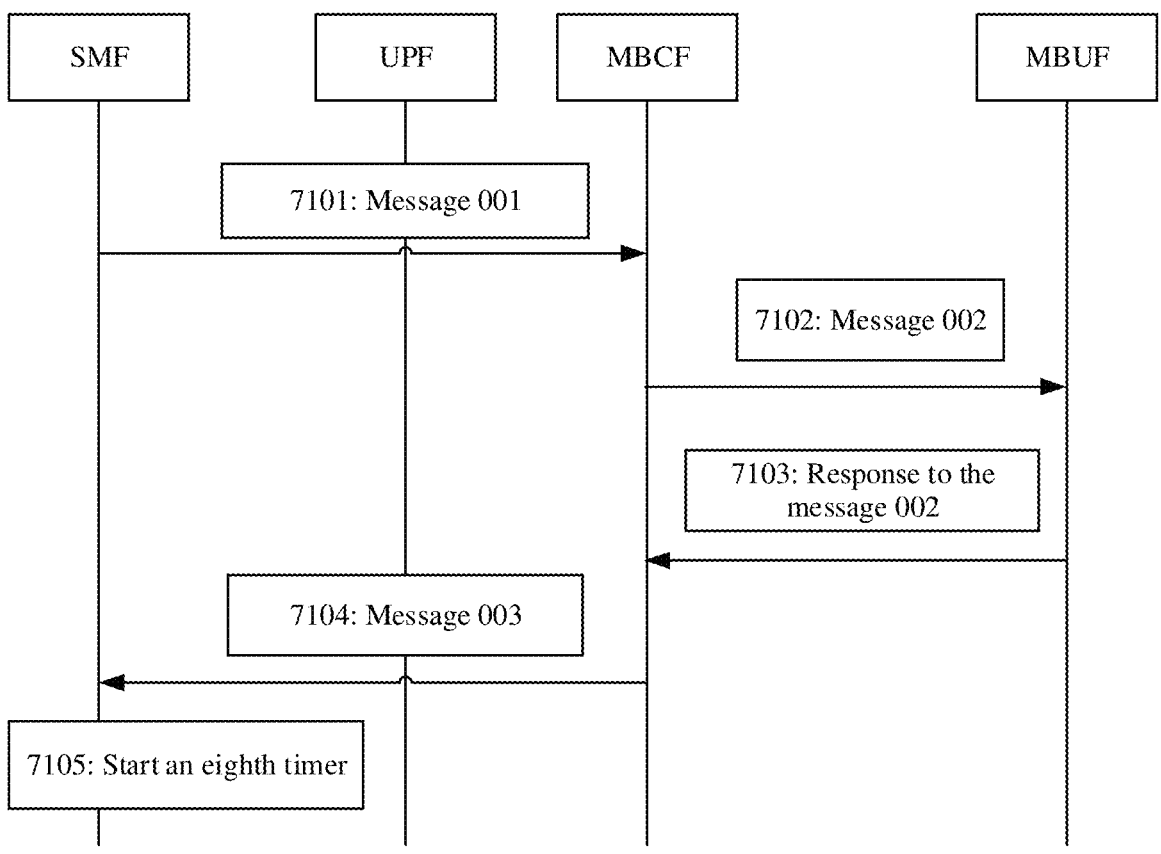
FIG. 7c is a schematic flowchart of a method for determining to start an eighth timer according to this application.

FIG. 7*c* shows a method for determining to start an eighth timer according to this application. The method includes the following steps:

Step 7101: The SMF sends a message 001 to the MBCF.

The message 001 may be used to request to establish a multicast/broadcast session tunnel between the target access network device and the MBUF, and the message 001 may include identifier information that is of the multicast/broadcast session tunnel and that is allocated by the target access network device.

Step 7102: The MBCF sends a message 002 to the MBUF.

The identifier information of the multicast/broadcast session tunnel is sent to the MBUF, so that the MBUF may establish the multicast/broadcast session tunnel with the target access network device. In this way, the second multicast/broadcast service data may reach the target access network device.

Step 7103: The MBUF sends a response message of the message 002 to the MBCF.

Step 7104: The MBCF sends a message 003 to the SMF. Correspondingly, the SMF receives the message 003 from the MBCF.

The message 003 is a response message of the message 001.

Step 7105: The SMF starts an eighth timer.

Implementation B

Figure 7D:
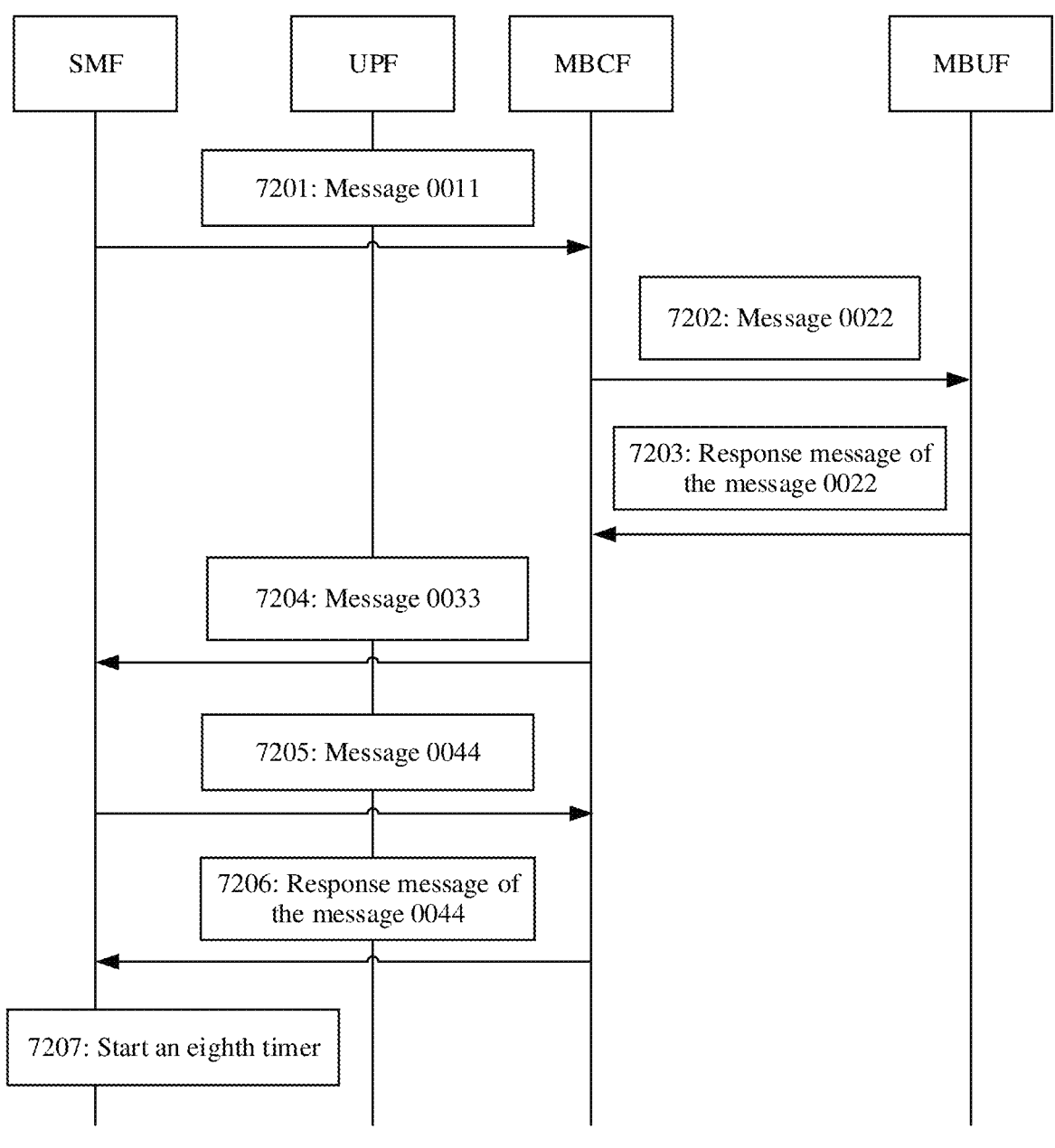
FIG. 7d is a schematic flowchart of another method for determining to start an eighth timer according to this application.

FIG. 7*d* shows another method for determining to start an eighth timer according to this application. The method includes the following steps:

Step 7201: The SMF sends a message 0011 to the MBCF.

The message 0011 may be used to request to establish a multicast/broadcast service data transmission tunnel between the UPF and the MBUF, and the message 0011 includes identifier information that is of a PDU session tunnel of the UPF and that is allocated by the SMF.

Step 7202: The MBCF sends a message 0022 to the MBUF.

Herein, the message 0022 may include the identifier information of the PDU session tunnel of the UPF. The identifier information that is of the PDU session tunnel of the UPF and that is allocated by the SMF is sent to the MBUF, so that the MBUF may establish the multicast/broadcast service data transmission tunnel with the UPF. In this way, the second multicast/broadcast service data may reach the UPF.

Step 7203: The MBUF sends a response message of the message 0022 to the MBCF.

Step 7204: The MBCF sends a message 0033 to the SMF.

The message 0033 is a response message of the message 0011.

Step 7205: The SMF sends a message 0044 to the UPF.

The message 0044 includes identifier information that is of a multicast/broadcast session tunnel and that is allocated by the target access network device.

Step 7206: The UPF sends a response message of the message 0044 to the SMF.

Herein, the UPF may establish the multicast/broadcast session tunnel with the target access network device.

Step 7207: The SMF starts an eighth timer.

It should be noted that the multicast/broadcast service data transmission tunnel between the MBUF and the UPF may be first established, or a multicast/broadcast session tunnel between the UPF and the target access network device may be first established. FIG. 7*d* is described by using an example in which a multicast/broadcast service data transmission tunnel between an MBUF and a UPF is first established.

Implementation C: The SMF starts the eighth timer after receiving a PDU session context update request (Nsmf_PDU Session_Update SMContext Request) from the AMF.

Implementation D

Figure 7E:
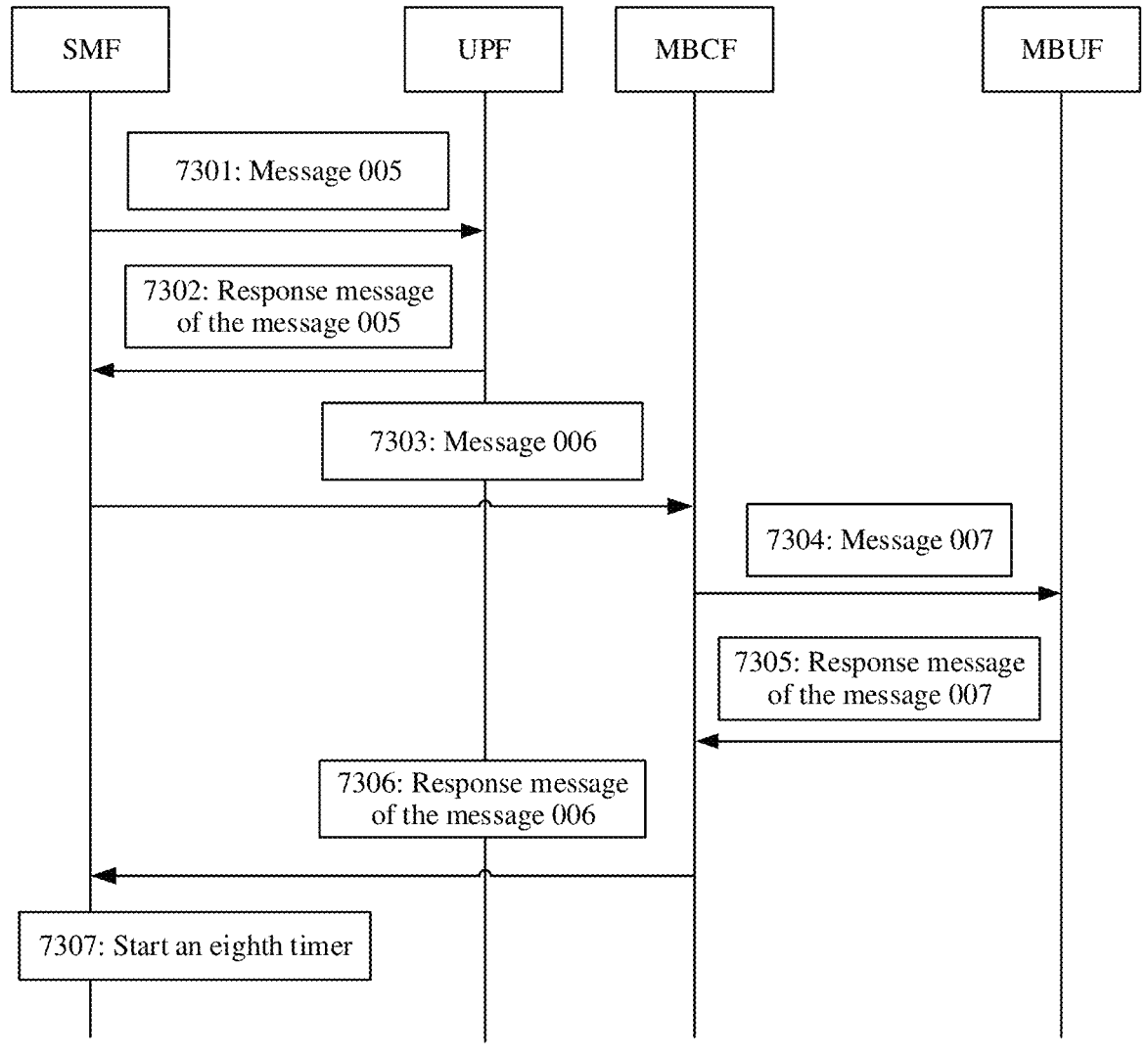
FIG. 7e is a schematic flowchart of another method for determining to start an eighth timer according to this application.

FIG. 7*e* shows another method for determining to start an eighth timer according to this application. The method includes the following steps:

Step 7301: The SMF sends a message 005 to the UPF.

The message 005 includes first indication information, and the first indication information indicates the UPF to store second multicast/broadcast service data from the MBUF.

Step 7302: The UPF sends a response message of the message 005 to the SMF.

If the UPF allocates identifier information of a PDU session tunnel of the UPF, the response message of the message 005 may include the identifier information that is of the PDU session tunnel and that is allocated by the UPF.

Step 7303: The SMF sends a message 006 to the MBCF.

The message 006 may be used to request to establish a multicast/broadcast session tunnel between the target access network device and the MBUF, and the message 006 may include the identifier information of the PDU session tunnel of the UPF in step 7302.

Step 7304: The MBCF sends a message 007 to the MBUF.

The message 007 may include the identifier information of the PDU session tunnel of the UPF. In this case, a multicast/broadcast session tunnel may be established between the MBUF and the UPF. In this way, the second multicast/broadcast service data may reach the UPF.

Step 7305: The MBUF sends a response message of the message 007 to the MBCF.

Step 7306: The MBCF sends a message 008 to the SMF.

The message 008 is a response message of the message 006.

Step 7307: The SMF starts an eighth timer.

Implementation E

Figure 7F:
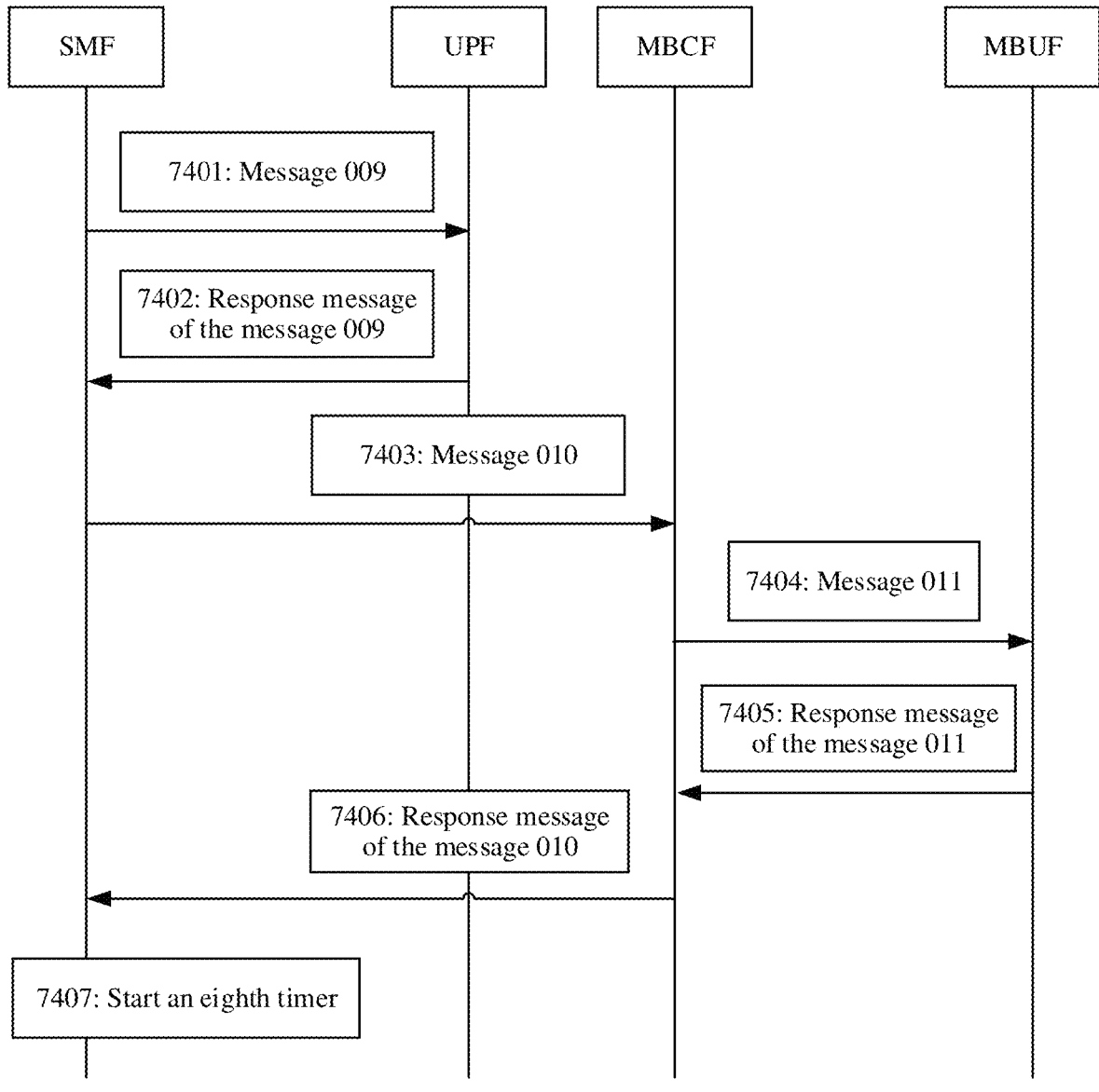
FIG. 7f is a schematic flowchart of another method for determining to start an eighth timer according to this application.

FIG. 7f shows another method for determining to start an eighth timer according to this application. The method includes the following steps:

Step 7401: The SMF sends a message 009 to the UPF.

The message 009 may include identifier information of a PDU session tunnel of the target access network device. Further, optionally, if the SMF allocates identifier information of a PDU session tunnel of the UPF, the message 009 may further carry the identifier information that is of the PDU session tunnel of the UPF and that is allocated by the SMF. Further, optionally, the message 009 may further include packet detection rule PDR information of a multicast/broadcast service.

Step 7402: The UPF sends a response message of the message 009 to the SMF.

If the UPF allocates identifier information of a PDU session tunnel of the UPF, the response message of the message 009 may include the identifier information of the PDU session tunnel of the UPF.

Step 7403: The SMF sends a message 010 to the MBCF.

The message 010 may include the identifier information of the PDU session tunnel of the UPF in step 1702.

Step 7404: The MBCF sends a message 011 to the MBUF.

The message 011 may include the identifier information of the PDU session tunnel of the UPF. In this case, a multicast/broadcast service data transmission tunnel between the MBUF and the UPF may be established. In this way, the second multicast/broadcast service data may reach the UPF.

Step 7405: The MBUF sends a response message of the message 011 to the MBCF.

Step 7406: The MBCF sends a message 012 to the SMF.

The message 012 is a response message of the message 010.

Step 7407: The SMF starts an eighth timer.

The following provides examples of four methods in which the target access network device stops receiving the first multicast/broadcast service data sent by the source access network device.

Method 1: The SMF sets a third timer.

Figure 8:
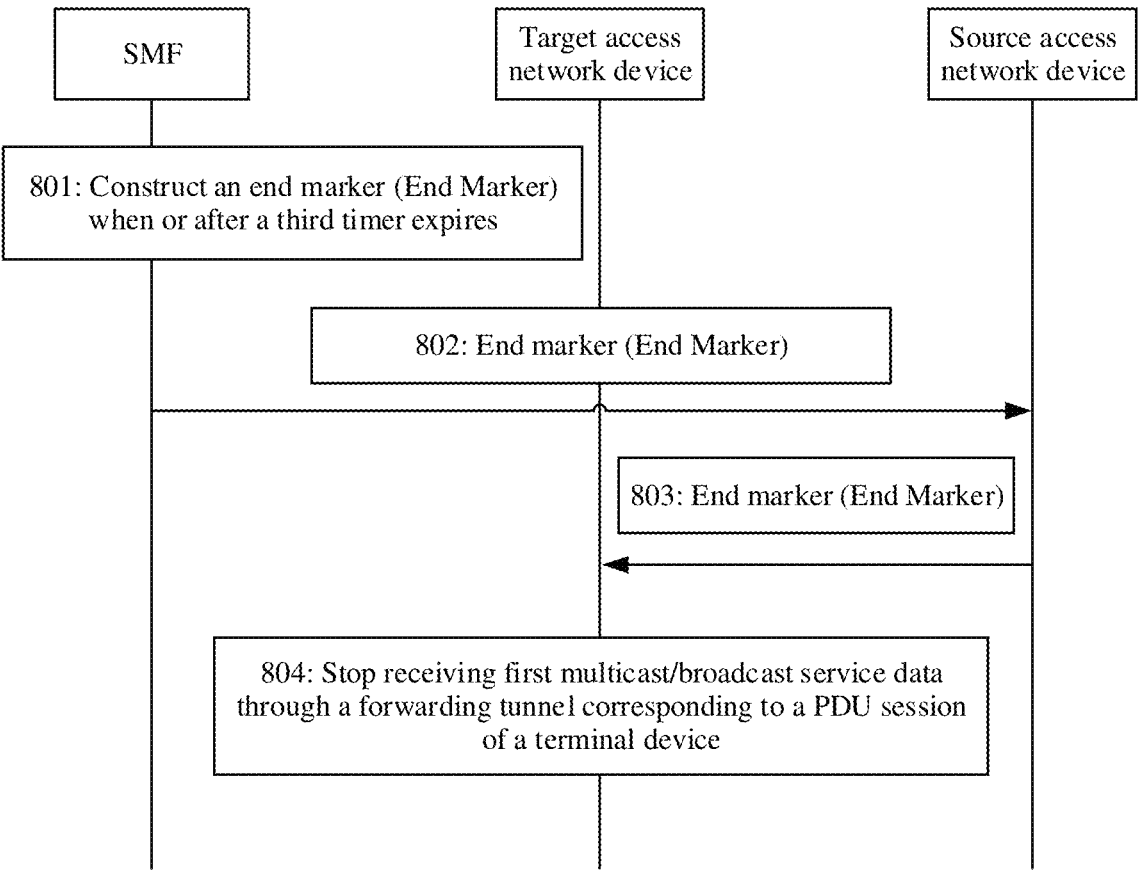
FIG. 8 is a schematic flowchart of a method in which a target access network device stops receiving first multicast/broadcast service data sent by a source access network device according to this application.

FIG. 8 is a schematic flowchart of a method in which a target access network device stops receiving first multicast/broadcast service data sent by a source access network device according to this application. The method includes the following steps:

Step 801: The SMF constructs an end marker (End Marker) when or after determining that a third timer expires.

Herein, the third timer is used to control the SMF to trigger construction and send the end marker to the target access network device. The end marker indicates the target access network device to stop receiving the first multicast/broadcast service data through a forwarding tunnel corresponding to a PDU session tunnel of a terminal device. The end marker may be a data packet. It may also be understood as that the third timer is used to control the SMF to trigger construction of the end marker, and send the end marker to the target access network device by using the source access network device. It should be understood that with reference to FIG. 7a, the third timer may be started after the SMF receives the fourth response message.

Step 802: The SMF sends the end marker to the source access network device. Correspondingly, the source access network device receives the end marker from the SMF.

Step 803: The source access network device sends the end marker to the target access network device. Correspondingly, the target access network device receives the end marker from the source access network device.

Herein, the source access network device may send the end marker to the target access network device through a forwarding tunnel corresponding to a PDU session of the terminal device.

Step 804: The target access network device stops receiving first multicast/broadcast service data through a forwarding tunnel corresponding to a PDU session of a terminal device. Further, optionally, the target access network device releases a resource of the forwarding tunnel corresponding to the PDU session.

With reference to FIG. 7a, in this method 1, after receiving the fourth response message in step 704, the SMF does not immediately construct and send the end marker, but constructs and sends the end marker only after the third timer expires. Duration of the third timer is set based on an actual situation, and is not limited herein. For example, the duration may be set to tens of milliseconds or several seconds, so that a packet loss of the multicast/broadcast service data caused by the terminal device during handover can be reduced.

Method 2: The UPF sets a fourth timer.

Figure 9:
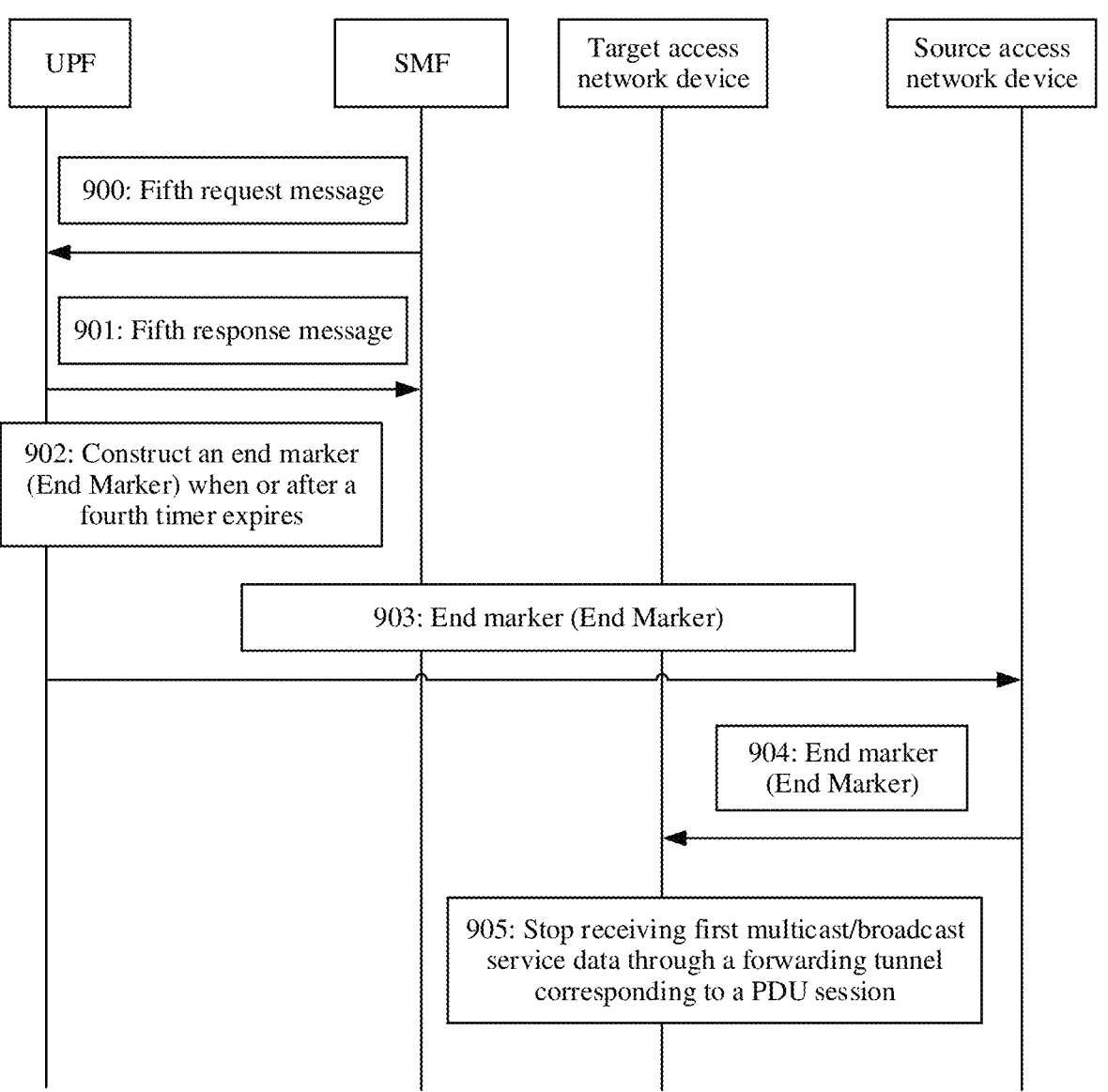
FIG. 9 is a schematic flowchart of a method in which a target access network device stops receiving first multicast/broadcast service data sent by a source access network device according to this application.

FIG. 9 is a schematic flowchart of another method in which a target access network device stops receiving first multicast/broadcast service data sent by a source access network device according to this application. The method includes the following steps:

Step 900: The SMF sends a fifth request message to the UPF.

The fifth request message includes fourth timer (Timer) information configured for the UPF, and the fourth timer is used to control the UPF to trigger construction and send an end marker. It should be understood that the fifth request message may be an N4 session update request message.

Step 901: The UPF sends a fifth response message to the SMF.

Herein, if the fifth request message may be the N4 session update request message, the fifth response message is an N4 session update response message.

Step 902: The UPF constructs a first end marker (End Marker) when or after determining that a fourth timer expires.

Herein, the fourth timer is used to control the UPF to trigger construction and send the end marker to the target access network device. The end marker indicates the target access network device to stop receiving the first multicast/ broadcast service data through a forwarding tunnel corresponding to a PDU session tunnel of a terminal device. It may also be understood as that the fourth timer is used to control the UPF to trigger construction of the end marker, and send the end marker to the target access network device by using the source access network device. It should be understood that the fourth timer may be started after the UPF sends the fifth response message.

Step 903: The UPF sends the end marker to the source access network device. Correspondingly, the source access network device receives the end marker from the UPF.

Step 904: The source access network device sends the end marker to the target access network device. Correspondingly, the target access network device receives the end marker from the source access network device.

For step 904, refer to the description of step 803. Details are not described herein again.

Step 905: The target access network device stops receiving first multicast/broadcast service data through a forwarding tunnel corresponding to a PDU session of a terminal device. Further, optionally, the target access network device releases a resource of the forwarding tunnel corresponding to the PDU session.

With reference to FIG. 7a, the UPF does not immediately construct and send the end marker after replying the fourth response message to the SMF, but constructs the end marker and sends the end marker to the target access network device only after the fourth timer expires. Duration of the fourth timer is set based on an actual situation, and is not limited herein. For example, the duration may be set to tens of milliseconds or several seconds, so that a packet loss of the multicast/broadcast service data caused by the terminal device during handover can be reduced.

Method 3: The UPF sets a second timer, and the SMF constructs an end marker.

In a possible implementation, the SMF may immediately construct the end marker after receiving a fourth response message; and then send the end marker to the UPF, and the UPF sends an end data packet to the target access network device after determining that the second timer expires. The target access network device stops receiving first multicast/broadcast service data through a forwarding tunnel corresponding to a PDU session of a terminal device, and releases a resource of the forwarding tunnel corresponding to the PDU session. It should be understood that the second timer may be started after the UPF receives the end marker from the SMF. It may also be understood as that the second timer is used to control the UPF to send the end marker to the target access network device by using the source access network device.

Method 4: The source access network device sets a fifth timer.

Figure 10:
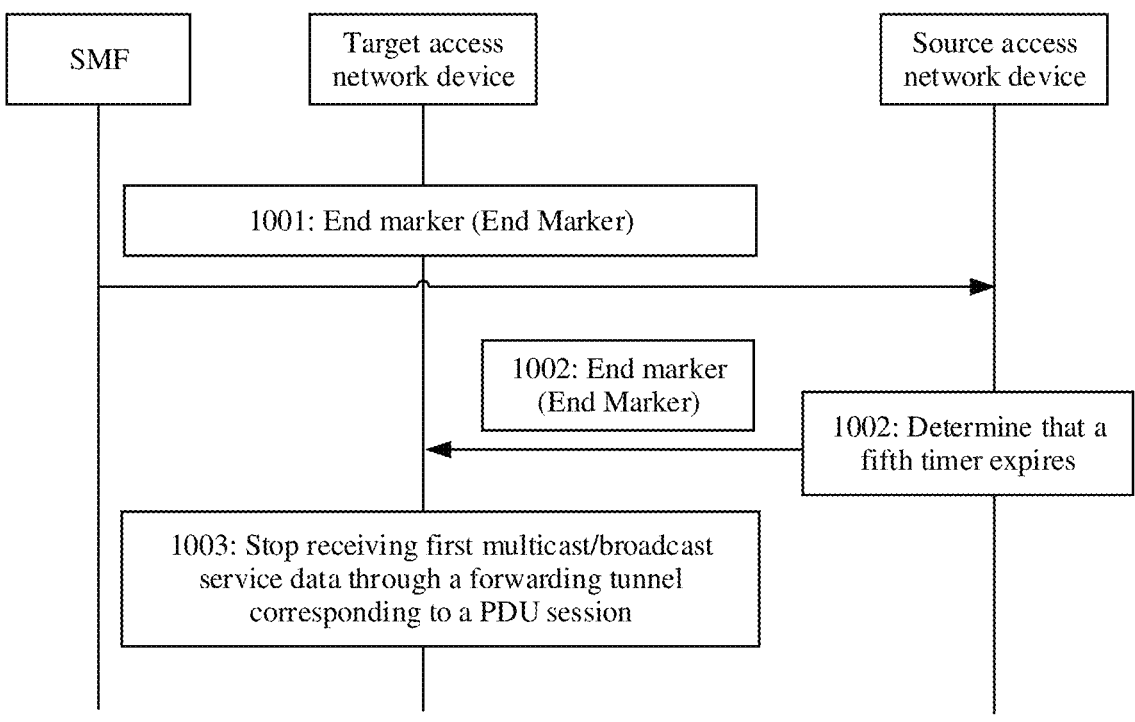
FIG. 10 is a schematic flowchart of a method in which a target access network device stops receiving first multicast/broadcast service data sent by a source access network device according to this application.

FIG. 10 is a schematic flowchart of another method in which a target access network device stops receiving first multicast/broadcast service data sent by a source access network device according to this application. The method includes the following steps:

Step 1001: The source access network device receives an end marker from the UPF or the SMF.

Herein, the UPF or the SMF constructs the end marker and sends the end marker to the source access network device. For details, refer to related descriptions of FIG. 9 and FIG. 8. Details are not described herein again.

Step 1002: The source access network device sends the end marker to the target access network device after determining that a fifth timer expires.

The fifth timer is used to control the source access network device to trigger to send the end marker to the target access network device. For a possible implementation of sending the end marker to the target access network device in step 1002, refer to the description of step 803. Details are not described herein again. It should be understood that the fifth timer may be started after the source access network device receives the end marker.

Step 1003: The target access network device stops receiving first multicast/broadcast service data through a forwarding tunnel corresponding to a PDU session of a terminal device. Further, optionally, the target access network device releases a resource of the forwarding tunnel corresponding to the PDU session.

With reference to FIG. 7a, the source access network device sets a fifth timer (Timer). After receiving the end marker, the source access network device does not immediately forward the end marker to the target access network device through the forwarding tunnel of the PDU session, but forwards the end marker to the target access network device only after the set fifth timer expires. Duration of the timer is set based on an actual situation, and is not limited herein. For example, the duration may be set to tens of milliseconds or several seconds, so that a packet loss of multicast/broadcast service data during handover of the terminal device is reduced.

Method 5: The source access network device sets a sixth timer, and the target access network device sets a seventh timer.

In a possible implementation, after determining that the sixth timer expires, the source access network device stops sending first multicast/broadcast service data to the target access network device through a forwarding tunnel of a PDU session. Further, after receiving an end marker from the source access network device, the target access device does not immediately stop receiving the first multicast/broadcast service data through the forwarding tunnel corresponding to the PDU session of a terminal device. The target access network device sets the sixth timer, and after determining that the sixth timer expires, stops receiving the first multicast/broadcast service data through the forwarding tunnel corresponding to the PDU session of the terminal device. Duration of the sixth timer is set based on an actual situation, and is not limited herein. For example, the duration may be set to tens of milliseconds or several seconds, so that a packet loss of multicast/broadcast service data of the terminal device can be reduced. Further, optionally, the target access network device releases a resource of the forwarding tunnel corresponding to the PDU session.

It should be noted that, in this method 5, a moment at which the sixth timer is started may be the same as a moment at which the foregoing first timer is started. Details are not described herein again. The seventh timer may be started after the target access network device receives the end marker. In addition, the duration of the timer set by the target access network device may be greater than or equal to duration of the timer set by the source access network device. When the duration of the timer set by the target access network device is equal to the duration of the timer set by the source access network device, synchronous matching of information may be set through an Xn interface between the target access network device and the source access network device.

It should be noted that a sequence of steps in the foregoing embodiments is merely an example, and constitutes no limitation on this application.

It may be understood that, to implement functions in the foregoing embodiments, the access network device and the terminal device include corresponding hardware structures and/or software modules for performing the functions. A person skilled in the art should be easily aware that, with reference with modules and method steps in the examples described in embodiments disclosed in this application, this application may be implemented by hardware or a combination of hardware and computer software. Whether a function is performed by hardware or hardware driven by computer software depends on particular application scenarios and design constraint conditions of the technical solutions.

Figure 11:
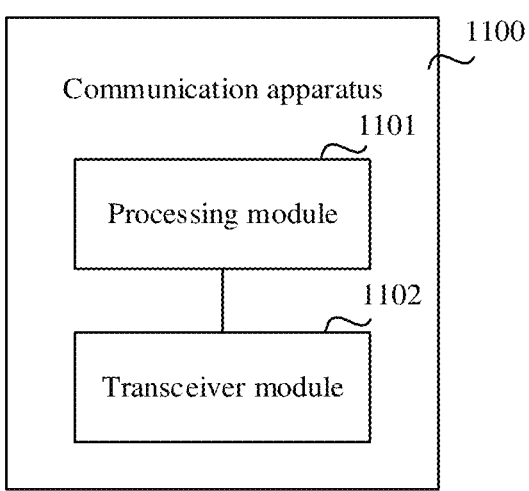
FIG. 11 is a schematic diagram of a structure of a communication apparatus according to this application.
Figure 12:
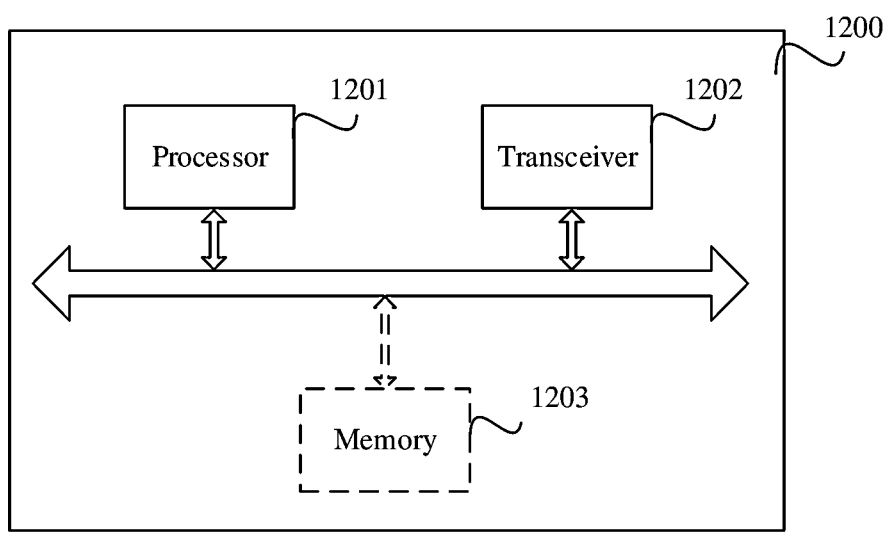
FIG. 12 is a schematic diagram of a structure of a communication apparatus according to this application.

Based on the foregoing content and a same concept, FIG. 11 and FIG. 12 each are a schematic diagram of a possible structure of a communication apparatus according to this application. The communication apparatus may be configured to implement functions of the terminal device or the access network device in the foregoing method embodiments. Therefore, beneficial effects of the foregoing method embodiments can also be achieved. In this application, the communication apparatus may be the terminal device shown in FIG. 1, or may be the access network device shown in FIG. 1, or may be a module (for example, a chip) applied to the terminal device or the access network device.

As shown in FIG. 11, the communication apparatus 1100 includes a processing module 1101 and a transceiver module 1102. The communication apparatus 1100 is configured to implement functions of the terminal device or the access network device in the method embodiments shown in FIG. 5 to FIG. 10.

When the communication apparatus 1100 is configured to implement functions of the source access network device in the method embodiment shown in FIG. 5, the transceiver module 1102 is configured to: receive first radio bearer configuration information and second radio bearer configuration information from a target access network device, where the first radio bearer configuration information is used by a terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device; and send the first radio bearer configuration information and the second radio bearer configuration information to the terminal device.

When the communication apparatus 1100 is configured to implement functions of the target access network device in the method embodiment shown in FIG. 5, the processing module 1101 is configured to determine first radio bearer configuration information and second radio bearer configuration information of a terminal device, where the first radio bearer configuration information is used by the terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The transceiver module 1102 is configured to send the first radio bearer configuration information and the second radio bearer configuration information.

When the communication apparatus 1100 is configured to implement functions of the terminal device in the method embodiment shown in FIG. 5, the transceiver module 1102 is configured to: receive first radio bearer configuration information and second radio bearer configuration information from a source access network device, where the first radio bearer configuration information is used by a terminal device to receive first multicast/broadcast service data that is transmitted in an air interface unicast mode and that is from a target access network device, and the second radio bearer configuration information is used by the terminal device to receive second multicast/broadcast service data that is transmitted in an air interface multicast/broadcast mode or an air interface unicast mode and that is from the target access network device; and receive the first multicast/broadcast service data from the target access network device in an air interface unicast mode, and receive the second multicast/broadcast service data from the target access network device in an air interface multicast/broadcast mode or an air interface unicast mode, where the first multicast/broadcast service data is associated with a PDU session of the terminal device.

For more detailed descriptions of the processing module 1101 and the transceiver module 1102, directly refer to the related descriptions in the method embodiment shown in FIG. 5. Details are not described herein again.

It should be understood that, in this embodiment of this application, the processing module 1101 may be implemented by a processor or a processor-related circuit component, and the transceiver module 1102 may be implemented by a transceiver or a transceiver-related circuit component.

When the communication apparatus 1100 is configured to implement functions of the source access network device in the method embodiment shown in FIG. 6, the transceiver module 1102 cooperates with the processing module 1101, and is configured to: receive first radio bearer configuration information from the target access network device, where the first radio bearer configuration information is used by the terminal device to receive the first multicast/broadcast service data that is transmitted in an air interface unicast mode and that is from the target access network device, and send the first radio bearer configuration information to the terminal device; and after receiving first information from the target access network device, send the second radio bearer configuration information to the terminal device, and stop sending the first multicast/broadcast service data to the target access network device, where the first information indicates the source access network device to stop sending the first multicast/broadcast service data to the target access network device, and the first multicast/broadcast service data is associated with a PDU session of the terminal device.

When the communication apparatus 1100 is configured to implement functions of the target access network device in the method embodiment shown in FIG. 6, the processing module 1101 is configured to determine first radio bearer configuration information and second radio bearer configuration information of a terminal device, where the first radio bearer configuration information is used by the terminal device to receive first multicast/broadcast service data that is transmitted in an air interface unicast mode and that is from the target access network device, and the second radio bearer configuration information is used by the terminal device to receive second multicast/broadcast service data that is transmitted in an air interface multicast/broadcast mode or an air interface unicast mode and that is from the target access network device. The transceiver module 1102 is configured to: receive first radio bearer configuration information from the source access network device, where the first radio bearer configuration information is used by the terminal device to receive the first multicast/broadcast service data that is transmitted in an air interface unicast mode and that is from the target access network device; and receive the first multicast/broadcast service data from the source access network device, where the first multicast/broadcast service data is associated with a PDU session of the terminal device. The processing module 1101 is configured to, if determining that the received first multicast/broadcast service data is synchronous with the second multicast/broadcast service data, send first information to the source access network device, where the first information indicates the source access network device to stop sending the first multicast/broadcast service data to the target access network device. The transceiver module 1102 is further configured to send the second radio bearer configuration information to the terminal device, where the second radio bearer configuration information is used by the terminal device to receive the second multicast/broadcast service data that is transmitted in an air interface multicast/broadcast mode or an air interface unicast mode and that is from the target access network device.

When the communication apparatus 1100 is configured to implement functions of the target access network device in the method embodiment shown in FIG. 6, the transceiver module 1102 is configured to receive first multicast/broadcast service data from a source access network device and second multicast/broadcast service data from a core network device. The processing module 1101 is configured to, if determining that the first multicast/broadcast service data is synchronous with the second multicast/broadcast service data, send the second multicast/broadcast service data to a terminal device.

Based on the foregoing content and a same concept, as shown in FIG. 12, this application further provides a communication apparatus 1200. The communication apparatus 1200 may include a processor 1201 and a transceiver 1202. The processor 1201 and the transceiver 1202 are coupled to each other. It may be understood that the transceiver 1202 may be an interface circuit or an input/output interface. Optionally, the communication apparatus 1200 may further include a memory 1203, configured to store instructions executed by the processor 1201, store input data required for running instructions by the processor 1201, or store data generated after the processor 1201 runs instructions.

When the communication apparatus 1200 is configured to implement the method shown in FIG. 5, FIG. 6, FIG. 7a, FIG. 7b, FIG. 7c, FIG. 7d, FIG. 7e, FIG. 7f, FIG. 8, FIG. 9, or FIG. 10, the processor 1201 is configured to perform functions of the processing module 1101, and the transceiver 1202 is configured to perform functions of the transceiver module 1102.

When the communication apparatus is a chip used in a terminal device, the chip in the terminal device implements functions of the terminal device in the foregoing method embodiments. The chip in the terminal device receives information from another module (for example, a radio frequency module or an antenna) in the terminal device, where the information is sent by an access network device to the terminal device. Alternatively, the chip in the terminal device sends information to another module (for example, a radio frequency module or an antenna) in the terminal device, where the information is sent by the terminal device to an access network device.

When the communication apparatus is a chip used in an access network device, the chip in the access network device implements functions of the access network device in the foregoing method embodiments. The chip in the access network device receives information from another module (for example, a radio frequency module or an antenna) in the access network device, where the information is sent by a terminal device to the access network device. Alternatively, the chip in the access network device sends information to another module (for example, a radio frequency module or an antenna) in the access network device, where the information is sent by the access network device to a terminal device.

Figure 13:
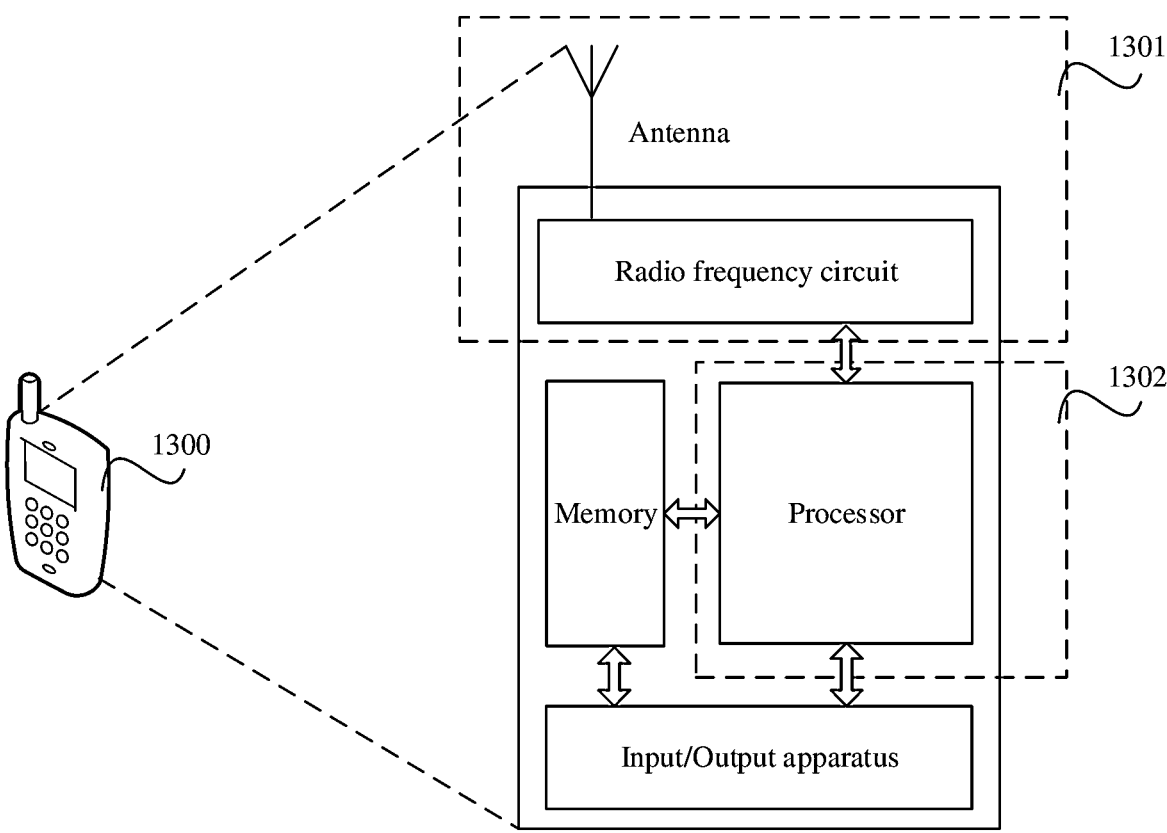
FIG. 13 is a schematic diagram of a structure of a terminal device according to this application.

When the communication apparatus is a terminal device, FIG. 13 is a simplified schematic diagram of a structure of the terminal device. For ease of understanding and illustration, an example in which the terminal device is a mobile phone is used in FIG. 13. As shown in FIG. 13, the terminal device 1300 includes a processor, a memory, a radio frequency circuit, an antenna, and an input/output apparatus. The processor is mainly configured to: process a communication protocol and communication data, control the entire terminal device, execute a software program, and process data of the software program, for example, is configured to support the terminal device 1300 in executing the method executed by terminal device in any one of the foregoing embodiments. The memory is mainly configured to store the software program and the data. The radio frequency circuit is mainly configured to: perform conversion between a baseband signal and a radio frequency signal, and process the radio frequency signal. The antenna is mainly configured to receive and send the radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

After the terminal device is powered on, the processor may read the software program in the memory, interpret and execute instructions of the software program, and process the data of the software program. When data needs to be sent, the processor performs baseband processing on the to-be-sent data, and then outputs a baseband signal to the radio frequency circuit. The radio frequency circuit performs radio frequency processing on the baseband signal, and then sends a radio frequency signal through the antenna in a form of an electromagnetic wave. When data is sent to the terminal device 1300, the radio frequency circuit receives the radio frequency signal through the antenna, converts the radio frequency signal into a baseband signal, and outputs the baseband signal to the processor. The processor converts the baseband signal into data, and processes the data.

In an optional implementation, the processor may include a baseband processor and a central processing unit. The baseband processor is mainly configured to process the communication protocol and the communication data. The central processing unit is mainly configured to: control the entire terminal device 1300, execute the software program, and process the data of the software program. The processor in FIG. 13 integrates functions of the baseband processor and the central processing unit. It should be noted that the baseband processor and the central processing unit may alternatively be processors independent of each other, and are interconnected by using technologies such as a bus. In addition, the terminal device may include a plurality of baseband processors to adapt to different network standards, and the terminal device 1300 may include a plurality of central processing units to enhance a processing capability of the terminal device. Components of the terminal device

1300 may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in a storage module in a form of the software program. The processor executes the software program to implement a baseband processing function.

In this application, the antenna and the radio frequency circuit that have sending and receiving functions may be considered as a transceiver module of the terminal device, and the processor that has a processing function may be considered as a processing module of the terminal device. As shown in FIG. 13, the terminal device includes a processing module 1301 and a transceiver module 1302. The transceiver module may also be referred to as a transceiver, a transceiver apparatus, or the like. The processing module may also be referred to as a processor, a processing board, a processing unit, a processing apparatus, or the like. Optionally, a device that is configured to implement the receiving function and that is in the transceiver module may be considered as a receiving module, and a device that is configured to implement the sending function and that is in the transceiver module may be considered as a sending module. In other words, the transceiver module includes the receiving module and the sending module. For example, the receiving module may also be referred to as a receiver, a receive circuit, or the like, and the sending module may be referred to as a transmitter, a transmit circuit, or the like.

On a downlink, a downlink signal (including data and/or control information) sent by an access network device is received by using the antenna. On an uplink, an uplink signal (including data and/or control information) is sent to the access network device or another terminal device by using the antenna. In the processor, service data and a signaling message are processed. These modules perform processing by using a radio access technology used in a radio access network (such as an access technology in an LTE system, an NR system, and another evolved system). The processor is further configured to control and manage an action of the terminal device, and is configured to perform processing performed by the terminal device in the foregoing embodiments. The processor is further configured to support the terminal device in performing the method performed by the terminal device in FIG. 5 or FIG. 6.

It should be noted that FIG. 13 shows only one memory, one processor, and one antenna. In an actual terminal device, the terminal device may include any quantity of antennas, memories, processors, and the like. The memory may also be referred to as a storage medium, a storage device, or the like. In addition, the memory may be disposed independent of the processor, or may be integrated with the processor. This is not limited in this embodiment of this application.

It should be understood that the transceiver module 1302 is configured to perform a sending operation and a receiving operation on a side of the terminal device in the foregoing method embodiment shown in FIG. 5 or FIG. 6, and the processing module 1301 is configured to perform operations other than the receiving and sending operations on the side of the terminal device in the foregoing method embodiment shown in FIG. 5 or FIG. 6. For example, the transceiver module 1302 is configured to perform receiving and sending steps on the side of the terminal device in the embodiment shown in FIG. 5, for example, step 501 and step 507. The processing module 1301 is configured to perform operations other than the receiving and sending operations on the side of the terminal device in the embodiment shown in FIG. 5, for example, step 509. For another example, the transceiver module 1302 is configured to perform receiving and sending steps on the side of the terminal device in the embodiment shown in FIG. 6, for example, step 601 and step 607. The processing module 1301 is configured to perform operations other than the receiving and sending operations on the side of the terminal device in the embodiment shown in FIG. 6.

When the communication apparatus is a chip-type apparatus or circuit, the communication apparatus may include a transceiver module and a processing module. The transceiver module may be an input/output circuit and/or an interface circuit. The processing module may be a processor, a microprocessor, or an integrated circuit integrated on the chip.

Figure 14:
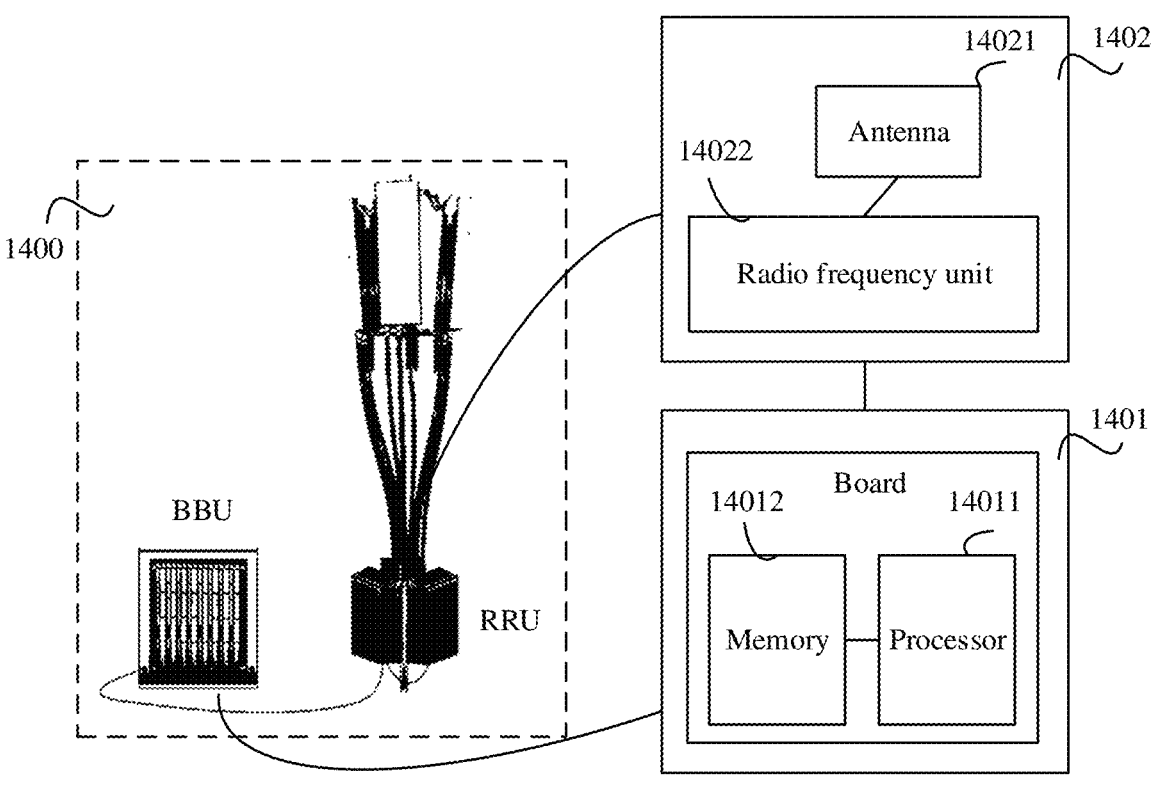
FIG. 14 is a schematic diagram of a structure of an access network device according to this application.

When the communication apparatus is an access network device, FIG. 14 is a schematic structural diagram of an access network device according to this application. As shown in FIG. 14, the access network device 1400 may include one or more radio frequency units, for example, a remote radio unit (remote radio unit, RRU) 1402 and one or more baseband units (baseband unit, BBU) 1401. The RRU 1402 may be referred to as a transceiver module, a transceiver machine, a transceiver circuit, a transceiver, or the like, and may include at least one antenna 14021 and a radio frequency unit 14022. The RRU 1402 is mainly configured to send and receive a radio frequency signal and perform conversion between the radio frequency signal and a baseband signal. The BBU 1401 may be referred to as a processing module, a processor, or the like, is mainly configured to perform baseband processing such as channel coding, multiplexing, modulation, and spectrum spreading, and is also configured to control the access network device, and the like. The RRU 1402 and the BBU 1401 may be physically disposed together, or may be physically separated, that is, in a distributed access network device.

The BBU 1401 is a control center of a base station, and may also be referred to as a processing module. The BBU may correspond to the processor 1201 in FIG. 12, and is mainly configured to implement a baseband processing function such as channel coding, multiplexing, modulation, and frequency spread. For example, the BBU (the processing module) may be configured to control the base station to perform operation procedures related to the access network device in the foregoing method embodiments.

In an optional implementation, the BBU 1401 may include one or more boards, and a plurality of boards may jointly support a radio access network (for example, an LTE network) having a single access standard, or may separately support radio access networks (such as an LTE network, a 5G network, or another network) having different access standards. The BBU 1401 further includes a memory 14012 and a processor 14011. The memory 14012 is configured to store necessary instructions and data. The processor 14011 is configured to control the access network device to perform a necessary action, for example, is configured to control the access network device to perform the method performed by the access network device in any one of the foregoing embodiments. The memory 14012 and the processor 14011 may serve one or more boards. In other words, the memory and the processor may be separately disposed on each board. Alternatively, the plurality of boards may share a same memory and processor. In addition, a necessary circuit is further disposed on each board.

On an uplink, an uplink signal (including data and the like) sent by a terminal device is received by using the antenna 14021. On a downlink, a downlink signal (including data and/or control information) is sent to the terminal device by using the antenna 14021. In the processor 14011, service data and a signaling message are processed. These modules perform processing by using a radio access technology used in a radio access network (such as an access technology in an LTE system, an NR system, and another evolved system). The processor 14011 is further configured to control and manage an action of the access network device, and is configured to perform processing performed by the access network device in the foregoing embodiments. The processor 14011 is further configured to support the access network device in performing the methods performed by the source access network device and the target access network device in FIG. 5 or FIG. 6.

It should be noted that FIG. 14 merely shows a simplified design of the access network device. During actual application, the access network device may include any quantity of antennas, memories, processors, radio frequency units, RRUs, BBUs, and the like, and all access network devices that can implement this application fall within the protection scope of this application.

It should be understood that the transceiver module 1402 is configured to perform a sending operation and a receiving operation on a side of the access network device in the foregoing method embodiment shown in FIG. 5 or FIG. 6, and the processing module 1401 is configured to perform operations other than the receiving and sending operations on the side of the access network device in the foregoing method embodiment shown in FIG. 5. For example, the transceiver module 1402 is configured to perform receiving and sending steps on the side of the access network device in the embodiment shown in FIG. 5, for example, step 502, step 504, step 505, and step 508. The processing module 1401 is configured to perform operations other than the receiving and sending operations on the side of the access network device in the embodiment shown in FIG. 5, for example, step 503. For another example, the transceiver module 1402 is configured to perform receiving and sending steps on the side of the access network device in the embodiment shown in FIG. 6, for example, step 602, step 603, step 605, step 606, step 608, and step 612. The processing module 1401 is configured to perform operations other than receiving and sending operations on the side of the access network device in the embodiment shown in FIG. 6, for example, step 604 and step 609.

It may be understood that, the processor in this embodiment of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The general-purpose processor may be a microprocessor or any regular processor or the like.

The method steps in embodiments of this application may be implemented in a hardware manner, or may be implemented in a manner of executing software instructions by the processor. The software instructions may include a corresponding software module. The software module may be stored in a random access memory (random access memory, RAM), a flash memory, a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), a register, a hard disk, a removable hard disk, a CD-ROM, or any other form of storage medium well-known in the art. For example, a storage medium is coupled to the processor, so that the processor can read information from the storage medium or write information into the storage medium. Certainly, the storage medium may be a component of the processor. The processor and the storage medium may be disposed in the ASIC. In addition, the ASIC may be located in the access network device or the terminal device. Certainly, the processor and the storage medium may alternatively exist as discrete components in the access network device or the terminal device.

All or some of the foregoing embodiments may be implemented by software, hardware, firmware, or any combination thereof. When software is used to implement embodiments, all or some of embodiments may be implemented in a form of a computer program product. The computer program product includes one or more computer programs or instructions. When the computer programs or the instructions are loaded and executed on a computer, the procedures or functions in embodiments of this application are all or partially performed. The computer may be a general-purpose computer, a dedicated computer, a computer network, an access network device, user equipment, or another programmable apparatus. The computer programs or the instructions may be stored in a computer-readable storage medium or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium such as a floppy disk, a hard disk, or a magnetic tape, may be an optical medium such as a digital video disc (digital video disc, DVD), or may be a semiconductor medium such as a solid-state drive (solid-state drive, SSD).

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, "at least one" refers to one or more, and "a plurality of" refers to two or more. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural. "And/or" describes an association relationship between associated objects, and indicates that three relationships may exist. For example, A and/or B may indicate the following three cases: A exists alone, both A and B exist, and B exists alone, where A and B may be singular or plural. In the text descriptions of this application, the character "/" generally indicates an "or" relationship between the associated objects. In a formula in this application, the character "/" indicates a "division" relationship between the associated objects.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes. The terms "first", "second", and another similar expression are intended to distinguish between similar objects but do not necessarily indicate a specific order or sequence. In addition, the terms "include", "have", and any variant thereof are intended to cover non-exclusive inclusion, for example, include a series of steps or modules. Methods, systems, products, or devices are not necessarily limited to those steps or modules that are clearly listed, but may include other steps or modules that are not clearly listed or that are inherent to such processes, methods, products, or devices.

Clearly, a person skilled in the art can make various modifications and variations to this application without departing from the protection scope of this application. In this way, if these modifications and variations to this application fall within the scope of the claims of this application and their equivalent technologies, this application is also intended to cover these modifications and variations.

What is claimed is:

1. A communication method, comprising:

determining, by a target access network device or a chip in a target access network device, first radio bearer configuration information and second radio bearer configuration information of a terminal device, wherein the first radio bearer configuration information is to be used by the terminal device to receive first multicast/broadcast service data that is transmitted in an air interface unicast mode from the target access network device or the chip in the target access network device, and the second radio bearer configuration information is to be used by the terminal device to receive second multicast/broadcast service data that is transmitted in an air interface multicast/broadcast mode from the target access network device or the chip in the target access network device;

sending, by the target access network device or the chip in the target access network device, the first radio bearer configuration information and the second radio bearer configuration information to the terminal device through a source access network device.

2. The method according to claim 1, wherein the first multicast/broadcast service data and the second multicast/broadcast service data are data of a same-source service.

3. The method according to claim 1, wherein the method further comprises:

receiving, by the target access network device or the chip in the target access network device, the first multicast/broadcast service data from the source access network device.

4. The method according to claim 1, wherein the method further comprises:

receiving, by the target access network device or the chip in the target access network device, the first multicast/broadcast service data from the source access network device through a forwarding tunnel corresponding to a first multicast/broadcast session of the terminal device, wherein the first multicast/broadcast session corresponds to a multicast/broadcast service.

5. The method according to claim 1, wherein the method further comprises:

sending, by the target access network device or the chip in the target access network device, the first multicast/broadcast service data in the air interface unicast mode to the terminal device; and sending, by the target access network device or the chip in the target access network device, the second multicast/broadcast service data in the air interface multicast/broadcast mode to the terminal device.

6. A communication method, comprising:

receiving, by a terminal device or a chip in a terminal device, first radio bearer configuration information and second radio bearer configuration information of the terminal device or the chip in the terminal device from a source access network device;

receiving, by the terminal device or the chip in the terminal device using the first radio bearer configuration information, first multicast/broadcast service data that is transmitted in an air interface unicast mode from a target access network device; and receiving, by the terminal device or the chip in the terminal device using the second radio bearer configuration information, second multicast/broadcast service data that is transmitted in an air interface multicast/broadcast mode from the target access network device.

7. The method according to claim 6, wherein the first multicast/broadcast service data and the second multicast/broadcast service data are data of a same-source service.

8. A communication apparatus, comprising:

a transceiver;

at least one processor; and one or more memories coupled to the at least one processor and storing programming instructions executable by the at least one processor to cause the communication apparatus to:

determine first radio bearer configuration information and second radio bearer configuration information of a terminal device, wherein the first radio bearer configuration information is to be used by the terminal device to receive first multicast/broadcast service data that is transmitted in an air interface unicast mode from the communication apparatus, and the second radio bearer configuration information is to be used by the terminal device to receive second multicast/broadcast service data that is transmitted in an air interface multicast/broadcast mode from the communication apparatus; and send the first radio bearer configuration information and the second radio bearer configuration information to the terminal device through a source access network device.

9. The communication apparatus according to claim 8, wherein the first multicast/broadcast service data and the second multicast/broadcast service data are data of a same-source service.

10. The communication apparatus according to claim 8, wherein the programming instructions are executable by the at least one processor to further cause the communication apparatus to:

receive the first multicast/broadcast service data from the source access network device.

11. The communication apparatus according to claim 8, wherein the programming instructions are executable by the at least one processor to further cause the communication apparatus to:

receive the first multicast/broadcast service data from the source access network device through a forwarding tunnel corresponding to a first multicast/broad-cast session of the terminal device, wherein the first multicast/broadcast session corresponds to a multi-cast/broadcast service.

12. The communication apparatus according to claim 8, wherein the programming instructions are executable by the at least one processor to further cause the communication apparatus to: send the first multicast/broadcast service data in the air interface unicast mode to the terminal device, and send the second multicast/broadcast service data in the air interface multicast/broadcast mode to the terminal device.

13. A communication apparatus, comprising:
a transceiver;
at least one processor; and
one or more memories coupled to the at least one processor and storing programming instructions for execution by the at least one processor to cause the communication apparatus to:
   receive first radio bearer configuration information and second radio bearer configuration information of the communication apparatus from a source access network device;
   receive, by using the first radio bearer configuration information, first multicast/broadcast service data that is transmitted in an air interface unicast mode from a target access network device; and
   receive, by using the second radio bearer configuration information, second multicast/broadcast service data that is transmitted in an air interface multicast/broadcast mode from the target access network device.

14. The communication apparatus according to claim 13, wherein the first multicast/broadcast service data and the second multicast/broadcast service data are data of a same-source service.

15. A communication method, comprising:
receiving, by a source access network device or a chip in a source access network device, first radio bearer configuration information and second radio bearer configuration information from a target access network device, wherein
   the first radio bearer configuration information is to be used by a terminal device to receive first multicast/broadcast service data that is transmitted in an air interface unicast mode from the target access network device, and
   the second radio bearer configuration information is to be used by the terminal device to receive second multicast/broadcast service data that is transmitted in an air interface multicast/broadcast mode from the target access network device; and
sending, by the source access network device or the chip in the source access network device, the first radio bearer configuration information and the second radio bearer configuration information to the terminal device.

16. The method according to claim 15, wherein the first multicast/broadcast service data and the second multicast/broadcast service data are data of a same-source service.

17. The method according to claim 15, wherein the method further comprises:
sending, by the source access network device or the chip in the source access network device, the first multicast/broadcast service data to the target access network device.

18. The method according to claim 15, wherein the method further comprises:
sending, by the source access network device or the chip in the source access network device, the first multicast/broadcast service data to the target access network device through a forwarding tunnel corresponding to a first multicast/broadcast session of the terminal device, wherein the first multicast/broadcast session corresponds to a multicast/broadcast service.

19. A communication apparatus, comprising:
a transceiver;
at least one processor; and
one or more memories coupled to the at least one processor and storing programming instructions executable by the at least one processor to cause the communication apparatus to:
receive first radio bearer configuration information and second radio bearer configuration information from a target access network device, wherein
   the first radio bearer configuration information is to be used by a terminal device to receive first multicast/broadcast service data that is transmitted in an air interface unicast mode from the target access network device, and
   the second radio bearer configuration information is to be used by the terminal device to receive second multicast/broadcast service data that is transmitted in an air interface multicast/broadcast mode from the target access network device; and
send the first radio bearer configuration information and the second radio bearer configuration information to the terminal device.

20. The communication apparatus according to claim 19, wherein the first multicast/broadcast service data and the second multicast/broadcast service data are data of a same-source service.

21. The communication apparatus according to claim 19, wherein the programming instructions are executable by the at least one processor to further cause the communication apparatus to:
send the first multicast/broadcast service data to the target access network device.

22. The communication apparatus according to claim 19, wherein the programming instructions are executable by the at least one processor to further cause the communication apparatus to:
send the first multicast/broadcast service data to the target access network device through a forwarding tunnel corresponding to a first multicast/broadcast session of the terminal device, wherein the first multicast/broadcast session corresponds to a multicast/broadcast service.

23. A communication system, comprising:
a target access network device or a chip in a target access network device;
a source access network device or a chip in a source access network device; and
a terminal device or a chip in a terminal device;
wherein the target access network device or the chip in the target access network device is configured to:
   determine first radio bearer configuration information and second radio bearer configuration information of the terminal device or the chip in the terminal device, wherein
      the first radio bearer configuration information is to be used by the terminal device or the chip in the terminal device to receive first multicast/broadcast service data that is transmitted in an air interface unicast mode from the target access network device or the chip in the target access network device, and the second radio bearer configuration information is to be used by the terminal device or the chip in the terminal device to receive second multicast/broadcast service data that is transmitted in an air interface multicast/broadcast mode from the target access network device or the chip in the target access network device; and send the first radio bearer configuration information and the second radio bearer configuration information to the source access network device or the chip in the source access network device; and wherein the source access network device or the chip in the source access network device is configured to:

receive the first radio bearer configuration information and the second radio bearer configuration information; and send the first radio bearer configuration information and the second radio bearer configuration information to the terminal device or the chip in the terminal device; and wherein the terminal device or the chip in the terminal device is configured to:

receive the first radio bearer configuration information and the second radio bearer configuration information of the terminal device or the chip in the terminal device from the source access network device or the chip in the source access network device;

receive, by using the first radio bearer configuration information, the first multicast/broadcast service data that is transmitted in the air interface unicast mode from the target access network device or the chip in the target access network device; and receive, by using the second radio bearer configuration information, the second multicast/broadcast service data that is transmitted in the air interface multicast/broadcast mode from the target access network device or the chip in the target access network device.

24. The system according to claim 23, wherein the first multicast/broadcast service data and the second multicast/broadcast service data are data of a same-source service.

* * * * *